United States Patent
Park et al.

(10) Patent No.: US 10,732,793 B2
(45) Date of Patent: Aug. 4, 2020

(54) APPARATUS AND METHOD FOR PROVIDING INFORMATION VIA PORTION OF DISPLAY

(71) Applicant: Samsung Electronics Co., Ltd., Gyeonggi-do (KR)

(72) Inventors: Jihyun Park, Gyeonggi-do (KR); Gwanghui Lee, Gyeongsangbuk-do (KR); Yongjoo Shin, Gyeonggi-do (KR); Yongju Yu, Seoul (KR); Yongseob Yun, Gyeonggi-do (KR); Juyeong Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 464 days.

(21) Appl. No.: 15/131,900

(22) Filed: Apr. 18, 2016

(65) Prior Publication Data

US 2016/0306511 A1    Oct. 20, 2016

(30) Foreign Application Priority Data

Apr. 16, 2015 (KR) .................. 10-2015-0053743
Dec. 28, 2015 (KR) .................. 10-2015-0187109

(51) Int. Cl.
*G06F 3/0482* (2013.01)
*G06F 3/0481* (2013.01)
(Continued)

(52) U.S. Cl.
CPC ........ *G06F 3/0482* (2013.01); *G06F 3/04817* (2013.01); *G06F 3/04842* (2013.01); *G06F 3/04845* (2013.01); *G06F 3/04886* (2013.01); *G06F 3/14* (2013.01); *G09G 5/12* (2013.01); *H04M 1/72519* (2013.01);
(Continued)

(58) Field of Classification Search
None
See application file for complete search history.

(56) References Cited

U.S. PATENT DOCUMENTS 8,600,444 B2    12/2013  Jeong et al.
2005/0278261 A1*  12/2005  Omanson ............. G06F 3/0481
                                                                705/77

(Continued)

FOREIGN PATENT DOCUMENTS

EP       2 339 443       6/2011
KR       10-0769904      10/2007
WO       WO 2012/068407   5/2012

OTHER PUBLICATIONS

International Search Report dated Jul. 28, 2016 issued in counterpart application No. PCT/KR2016/003990, 10 pages.
(Continued)

*Primary Examiner* — Toan H Vu
(74) *Attorney, Agent, or Firm* — The Farrell Law Firm, P.C.

(57) ABSTRACT

An electronic device and method are provided for displaying information in the electronic device. The electronic device includes a display; and a processor configured to display an application (App) bar including at least one object through a first area of the display, display an execution screen through a second area of the display, and change at least one of the displayed App bar and the displayed execution screen, in response to a first user input received through the first area.

18 Claims, 33 Drawing Sheets

(51) Int. Cl.
*G06F 3/0488* (2013.01)
*H04M 1/725* (2006.01)
*G06F 3/0484* (2013.01)
*G06F 3/14* (2006.01)
*G09G 5/12* (2006.01)

(52) U.S. Cl.
CPC ............ *G06F 2203/04803* (2013.01); *G06F 2203/04804* (2013.01); *G09G 2370/02* (2013.01); *H04M 1/72597* (2013.01)

(56) References Cited

U.S. PATENT DOCUMENTS

| | | | |
|---|---|---|---|
| 2006/0087502 A1 | 4/2006 | Karidis et al. | |
| 2008/0174570 A1* | 7/2008 | Jobs .................. | G06F 3/0488 345/173 |
| 2010/0248788 A1 | 9/2010 | Yook et al. | |
| 2011/0225539 A1 | 9/2011 | Lee et al. | |
| 2011/0300910 A1* | 12/2011 | Choi .................. | G06F 3/0482 455/566 |
| 2012/0081267 A1 | 4/2012 | Sirpal et al. | |
| 2012/0150970 A1 | 6/2012 | Peterson et al. | |
| 2013/0024795 A1* | 1/2013 | Robotham ............ | G06F 3/0486 715/769 |
| 2013/0132878 A1* | 5/2013 | Tijssen ................. | G06F 3/0488 715/770 |
| 2013/0179815 A1 | 7/2013 | Choi | |
| 2014/0075394 A1 | 3/2014 | Nawle et al. | |
| 2014/0279948 A1* | 9/2014 | Mahate ............ | G06F 16/24578 707/692 |
| 2014/0359436 A1 | 12/2014 | Kim et al. | |
| 2014/0365912 A1* | 12/2014 | Shaw .................. | G06F 3/04817 715/748 |
| 2014/0380214 A1 | 12/2014 | Huang et al. | |
| 2015/0009152 A1* | 1/2015 | Tang ...................... | G09G 5/12 345/173 |
| 2015/0015513 A1 | 1/2015 | Kwak et al. | |
| 2015/0065107 A1* | 3/2015 | Dave .................. | H04M 1/72572 455/418 |
| 2015/0195620 A1* | 7/2015 | Buchner ............ | H04N 21/4788 725/141 |
| 2016/0057205 A1* | 2/2016 | Wang .................. | G06F 3/04817 715/748 |
| 2016/0125850 A1* | 5/2016 | Shah ..................... | G06F 3/1415 345/627 |
| 2016/0216862 A1* | 7/2016 | Turner .................. | G06F 3/0488 |

OTHER PUBLICATIONS

European Search Report dated Aug. 19, 2016 issued in counterpart application No. 16165854.7-1972, 9 pages.
European Search Report dated Nov. 16, 2016 issued in counterpart application No. 16165854.7-1972, 14 pages.

* cited by examiner

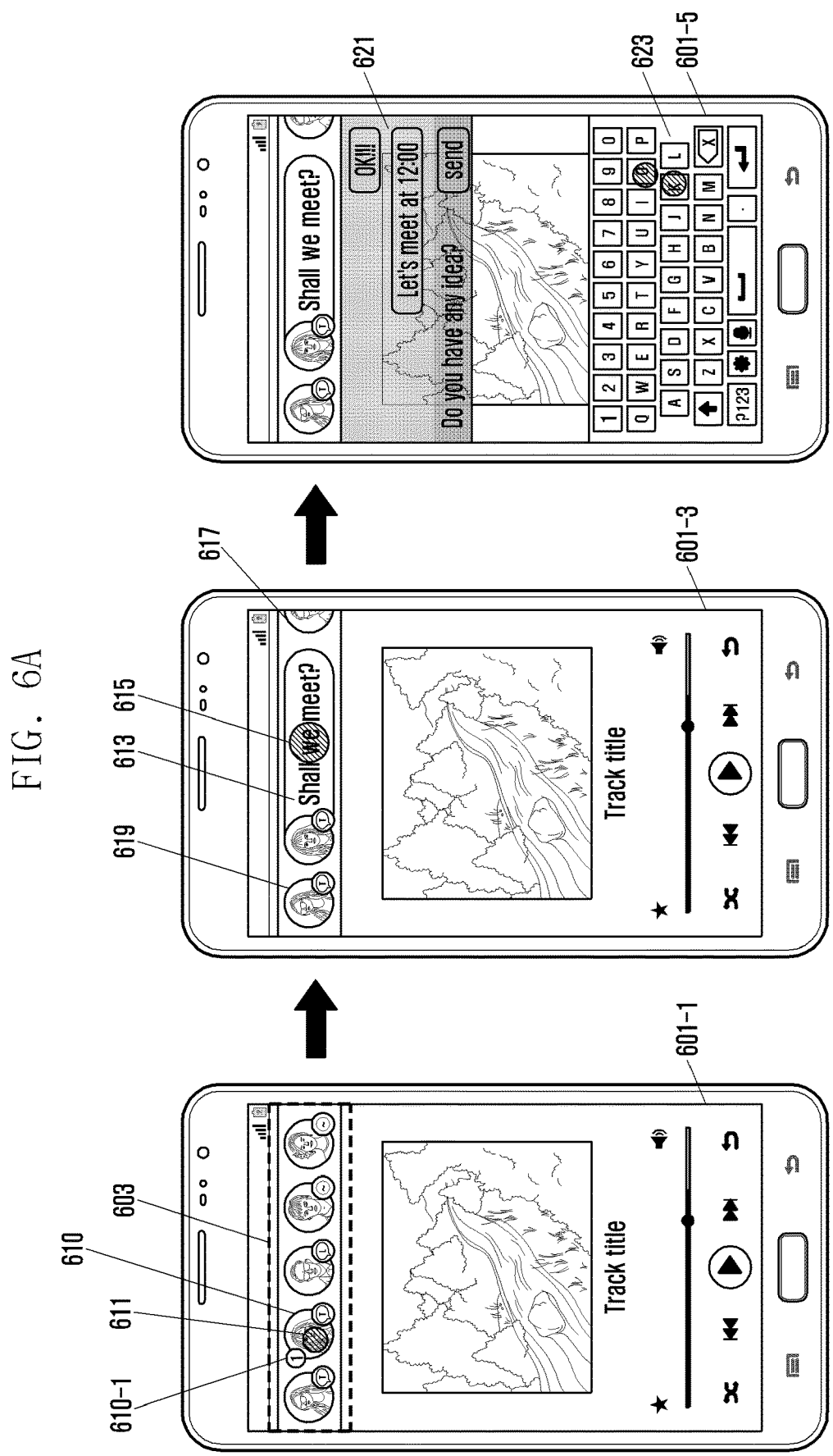

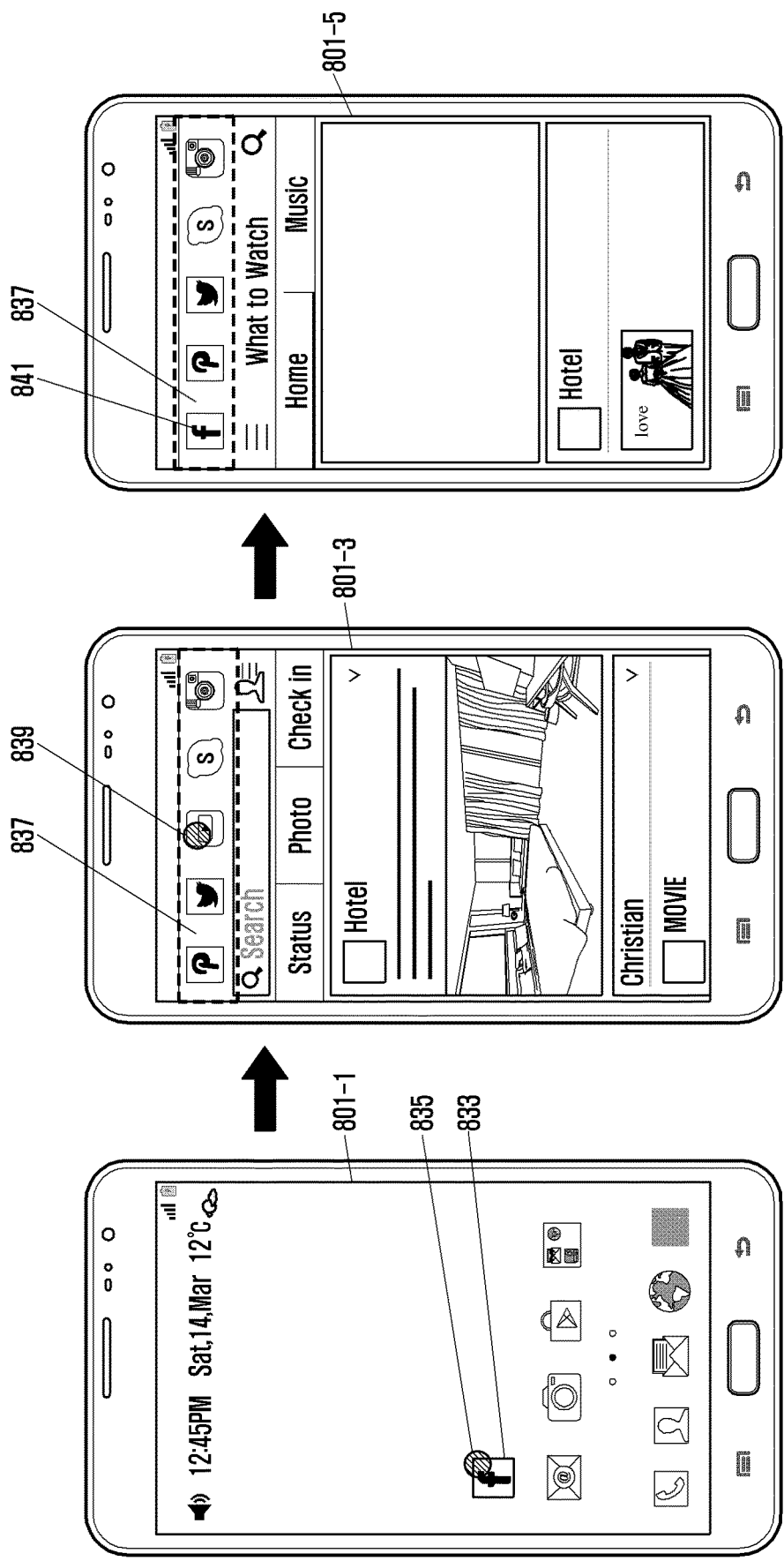

FIG. 23

| | Interaction | | Function |
|---|---|---|---|
| 2301 | ◯ | Tap | Action/Select |
| 2303 | ◯ | Tap & hold | Edit items<br>Select mode |
| 2305 | ←⊙ / ⊙→ | Swipe left/Right | Page navigation<br>Shortcuts(Contextual options) on the list |
| 2307 | ⊙↓ | Vertical swipe down | Scroll down<br>Launch the app |
| 2309 | ↑⊙ | Vertical swipe up | Scroll up<br>Qiut the app |
| 2311 | ⊙→⊙ | Tap & drag | Move items<br>Adjust value |

APPARATUS AND METHOD FOR PROVIDING INFORMATION VIA PORTION OF DISPLAY

PRIORITY

This application claims priority under 35 U.S.C. § 119(a) to Korean Patent Application Serial Nos. 10-2015-0053743 and 10-2015-0187109, which were filed in the Korean Intellectual Property Office on Apr. 16, 2015 and Dec. 28, 2015, respectively, the entire disclosure of each of which is hereby incorporated by reference.

BACKGROUND

1. Field of the Disclosure

The present disclosure relates generally to an electronic device and a method for providing information through a display thereof, and more particularly, to an electronic device and a method for providing diversified information through a subarea of a display that is independently controllable from a main area of the display.

2. Description of the Related Art

Electronic devices are generally capable of providing various functions, such as a telephone function, camera function, browser function, or messenger function for a user. For example, an electronic device may come equipped with a preloaded messenger application and additional messenger applications can also be installed therein, e.g., downloaded from a server providing various applications.

However, while the number of simultaneously executable applications has increased with the development of multitasking functions of an electronic device, a user interface for quick and effective control of the simultaneously executed applications has not been provided yet.

SUMMARY

Accordingly, the present disclosure is made to address at least the problems and/or disadvantages described above and to provide at least the advantages described below.

An aspect of the present disclosure is to provide diversified information through a subarea of a display that is independently controllable from a main area of the display.

In accordance with an aspect of the present disclosure, an electronic device is provided, which includes a display; and a processor configured to display an application (App) bar including at least one object through a first area of the display, display an execution screen through a second area of the display, and change at least one of the displayed App bar and the displayed execution screen, in response to a first user input received through the first area.

In accordance with another aspect of the present disclosure, a method is provided for operating an electronic device including a display. The method includes displaying an application (App) bar including at least one object through a first area of the display; displaying an execution screen through a second area of the display; receiving a first user input through the first area; and changing at least one of the displayed App bar and the displayed execution screen, based on the first user input.

In accordance with another aspect of the present disclosure, a non-transitory computer-readable storage media is provided for storing instructions, which when executed by a processor included in an electronic device, control the processor to display an application (App) bar including at least one object through a first area of a display; display an execution screen through a second area of the display; receive a first user input through the first area; and change at least one of the displayed App bar and the displayed execution screen, based on the first user input.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6A illustrates a user interface for providing additional information of an App bar according to an embodiment of the present disclosure;

FIG. 8 illustrates a user interface for providing an application switching function using an App bar in an electronic device according to an embodiment of the present disclosure;

FIG. 23 illustrates user inputs and corresponding functions in an electronic device according to an embodiment of the present disclosure;

DETAILED DESCRIPTION OF EMBODIMENTS OF THE PRESENT DISCLOSURE

Figure 1:
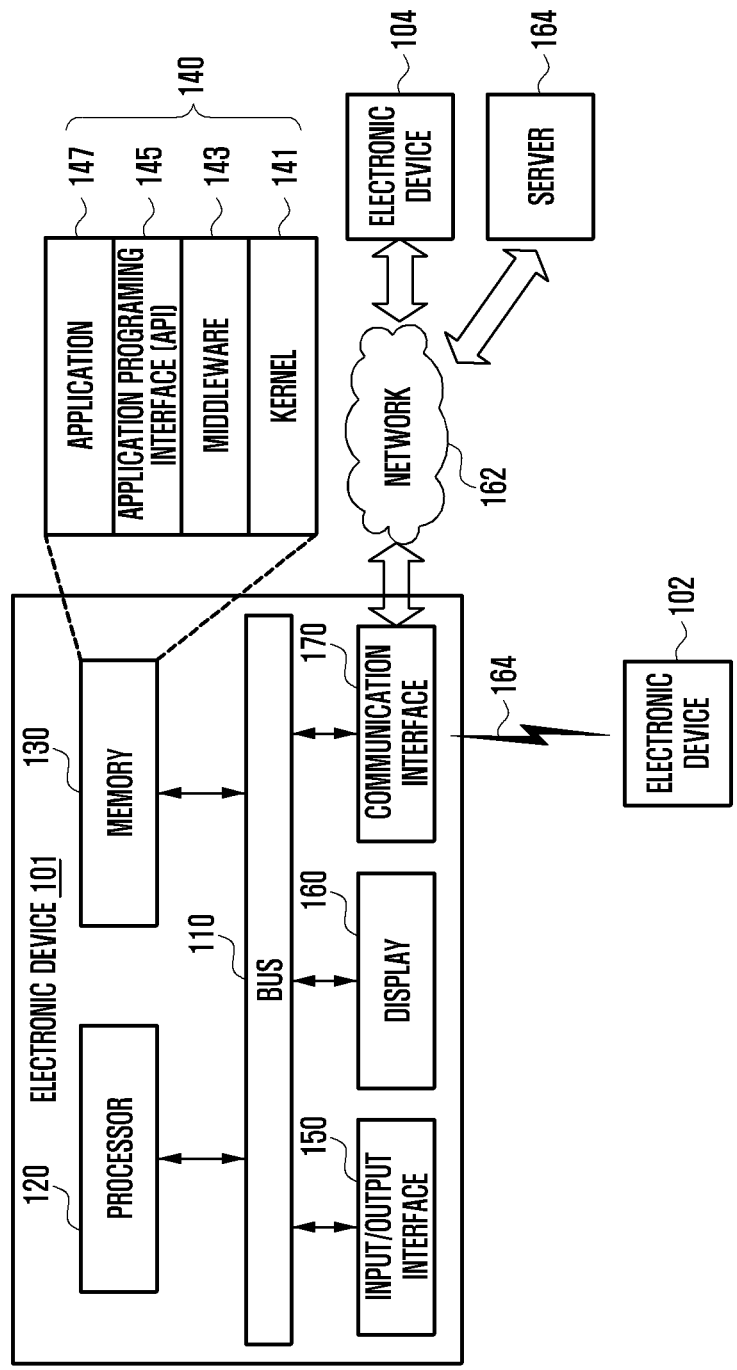
FIG. 1 illustrates a network environment including an electronic device according to an embodiment of the present disclosure.

Hereinafter, various embodiments of the present disclosure are described in detail with reference to the accompanying drawings. While the present disclosure may be embodied in many different forms, certain embodiments of the present disclosure are shown in the accompanying drawings and are described herein in detail, with the understanding that the present disclosure is not intended to be limited to the embodiments.

The same reference numbers are used throughout the accompanying drawings to refer to the same or like parts.

Terms used in the present disclosure are not intended to limit the present disclosure but merely illustrate embodiments thereof.

Unless defined differently, terms used herein have the same meanings as the meanings that may be generally understood by a person of ordinary skill in the art. Terms defined in a dictionary also have meanings corresponding to the context of the related technology and are not intended to be understood as having ideal or excessively formal meanings unless explicitly defined as such herein.

Herein, terms such as "comprise", "have", "comprising", "may comprise", etc., indicate the presence of a corresponding function, characteristic, numeral, step, operation, element, component, or combination thereof, and do not exclude the presence or addition of at least one other function, characteristic, numeral, step, operation, element, component, or combination thereof.

The term "or" includes any combination or the entire combination of words listed together. For example, "A or B" may include A, B, or A and B.

The terms "first" and "second" may represent various elements of the present disclosure, but do not limit corresponding elements. For example, these terms do not limit order and/or importance of corresponding elements. These terms may also be used for distinguishing one element from another element. For example, both a first user device and a second user device are user devices and represent different user devices. Accordingly, a first element may be referred to as a second element, and similarly, a second element may be referred to as a first element.

When an element is described as being "coupled" to another element, the element may be "directly coupled" to the other element or "electrically coupled" to the other element through a third element. However, when the element is described as being "directly coupled" to another element, no third element may exist between the element and the other element.

Herein, a singular form includes a plurality of forms unless it is explicitly represented differently.

Herein, the term "module" may refer to a certain unit that includes one of hardware, software and firmware or any combination thereof. The term "module" may be interchangeably used with the terms "unit," "logic," "logical block," "component," or "circuit," for example. The term "module" may also indicate a minimum unit, or part thereof, which performs one or more particular functions.

The term "module" may indicate a device formed mechanically or electronically. For example, the term "module" may indicate an device that includes at least one of an Application-Specific Integrated Circuit (ASIC), a Field-Programmable Gate Array (FPGA), and a programmable-logic device, which are known or will be developed.

In the present disclosure, an electronic device may be a device that involves a communication function. For example, an electronic device may be a smart phone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), a Moving Picture Experts Group Audio Layer 3 (MP3) player, a portable medical device, a digital camera, or a wearable device (e.g., a Head-Mounted Device (HMD) such as electronic glasses, electronic clothes, an electronic bracelet, an electronic necklace, an electronic appcessory, or a smart watch).

An electronic device may also be a smart home appliance that involves a communication function. For example, an electronic device may be a television (TV), a Digital Video Disk (DVD) player, audio equipment, a refrigerator, an air conditioner, a vacuum cleaner, an oven, a microwave oven, a washing machine, an air cleaner, a set-top box, a TV box (e.g., Samsung HomeSync™, Apple TV®, Google TV®, etc.), a game console, an electronic dictionary, an electronic key, a camcorder, or an electronic picture frame.

An electronic device may also be a medical device (e.g., a Magnetic Resonance Angiography (MRA) device, a Magnetic Resonance Imaging (MM) device, a Computed Tomography (CT) device, an ultrasonography device, etc.), a navigation device, a Global Positioning System (GPS) receiver, an Event Data Recorder (EDR), a Flight Data Recorder (FLD), a car infotainment device, electronic equipment for ship (e.g., a marine navigation system, a gyrocompass, etc.), avionics, security equipment, or an industrial or home robot.

An electronic device may also be furniture, a part of a building or construction having a communication function, an electronic board, an electronic signature receiving device, a projector, or various measuring instruments (e.g., a water meter, an electric meter, a gas meter, a wave meter, etc.).

An electronic device disclosed herein may also be any combination of the above-described devices. However, as will be understood by those skilled in the art, the present disclosure is not limited to the above-described examples of the electronic devices.

FIG. 1 illustrates a network environment including an electronic device according to an embodiment of the present invention.

Referring to FIG. 1, the electronic device 101 includes a bus 110, a processor 120, a memory 130, an input and output interface 150, a display 160, and a communication interface 170.

The bus 110 may be a circuit for interconnecting the elements described above and for allowing communication, e.g. by transferring a control message, between the elements.

The processor 120 may receive commands from the above-mentioned other elements, e.g. the memory 130, the input and output interface 150, the display 160, and the communication interface 170, through the bus 110, decipher the received commands, and perform operations and/or data processing according to the deciphered commands.

The memory 130 may store commands received from and/or data generated by the processor 120 and/or the other elements. The memory 130 includes software and/or programs 140, which include a kernel 141, middleware 143, an Application Programming Interface (API) 145, and applications 147. Each of the programming modules described above may be configured by software, firmware, hardware, and/or combinations of two or more thereof.

The kernel 141 may control and/or manage system resources, e.g. the bus 110, the processor 120, or the memory 130, used for execution of operations and/or functions implemented in other programming modules, such as the middleware 143, the API 145, and/or the application 147. Further, the kernel 141 may provide an interface through which the middleware 143, the API 145, and/or the application 147 access, control, and/or manage an individual element of the electronic device 101.

The middleware 143 may perform a relay function which allows the API 145 and/or the application 147 to communicate and exchange data with the kernel 141. Further, in relation to operation requests received from at least one of the applications 147, the middleware 143 may perform load balancing in relation to the operation requests by giving a priority in using a system resource, e.g. the bus 110, the processor 120, and/or the memory 130, of the electronic device 101 to at least one of the applications 147.

The API 145 is an interface through which the applications 147 may control a function provided by the kernel 141 and/or the middleware 143, and may include at least one interface or function for file control, window control, image processing, and/or character control.

The input and output interface 150 may receive a command and/or data from a user, and transfer the received command and/or data to the processor 120 and/or the memory 130 through the bus 110.

The display 160 displays an image, a video, and/or data to a user.

The communication interface 170 may establish a communication between the electronic device 101 and electronic devices 102 and 104 and/or a server 106. The communication interface 170 may support short range communication protocols (e.g., a WiFi® protocol, a BlueTooth (BT) protocol, and a Near Field Communication (NFC) protocol) and different communication networks (e.g., the Internet, a Local Area Network (LAN), a Wide Area Network (WAN), a telecommunication network, a cellular network, a satellite network, a Plain Old Telephone Service (POTS), or any other similar and/or suitable communication network), such as a network 162. The electronic devices 102 and 104 may be the same or different type of electronic device.

Figure 2:
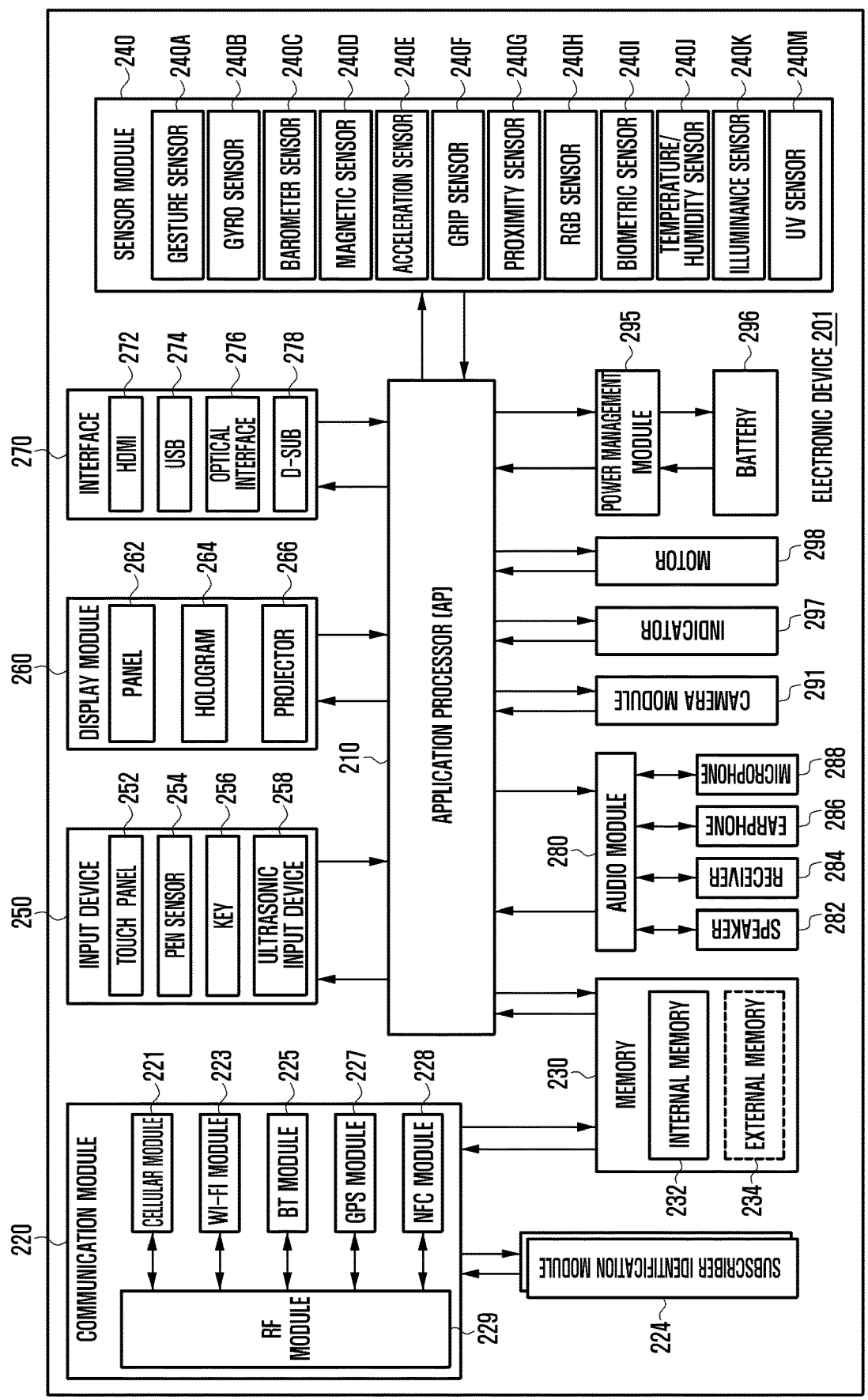
FIG. 2 illustrates an electronic device according to an embodiment of the present disclosure.

FIG. 2 illustrates an electronic device in accordance with an embodiment of the present disclosure.

Referring to FIG. 2, the electronic device 201 includes an Application Processor (AP) 210, a communication module 220, a Subscriber Identification Module (SIM) 224, a memory 230, a sensor module 240, an input device 250, a display module 260, an interface 270, an audio module 280, a camera module 291, a power management module 295, a battery 296, an indicator 297, and a motor 298.

The AP 210 may drive an operating system (OS) or applications, control a plurality of hardware or software components connected thereto, and perform processing and operations for various data including multimedia data. For example, the AP 210 may be formed of a System-on-Chip (SoC). The AP 210 may further include a Graphics Processing Unit (GPU).

The communication module 220 may perform a data communication with another electronic device or a server connected to the electronic device 201. The communication module 220 includes a cellular module 221, a WiFi module 223, a BT module 225, a GPS module 227, an NFC module 228, and a Radio Frequency (RF) module 229.

The cellular module 221 may offer a voice call, a video call, a message service, an Internet service, etc., through a communication network (e.g., Long Term Evolution (LTE), LTE Advanced (LTE-A), Code Division Multiple Access (CDMA), Wideband CDMA (WCDMA), Universal Mobile Telecommunications System (UMTS), Wireless Broadband (WiBro), or Global System for Mobile communications (GSM), etc.). Additionally, the cellular module 221 may perform identification and authentication of the electronic device 201 in the communication network, using the SIM 224.

The cellular module 221 may also perform at least part of the functions that the AP 210 can provide. For example, the cellular module 221 may perform at least part of a multimedia control function.

The cellular module 221 may include a Communication Processor (CP). Additionally, the cellular module 221 may be formed of an SoC.

Although some elements such as the cellular module 221 (e.g., the CP), the memory 230, or the power management module 295 are illustrated as separate elements outside of the AP 210 in FIG. 2, the AP 210 may also include at least a part (e.g., the cellular module 221) of these elements.

The AP 210 or the cellular module 221 may load commands or data, received from a nonvolatile memory connected thereto or from at least one of the other elements, into a volatile memory to process them. Additionally, the AP 210 or the cellular module 221 may store data, received from or created by one or more of the other elements, in the nonvolatile memory.

Each of the WiFi module 223, the BT module 225, the GPS module 227, and the NFC module 228 may include a processor for processing data transmitted or received therethrough. Although FIG. 2 illustrates the cellular module 221, the WiFi module 223, the BT module 225, the GPS module 227, and the NFC module 228 as different blocks, at least a part of these components may be included in an Integrated Circuit (IC) (or chip) or a IC package. For example, at least a part (e.g., the CP corresponding to the cellular module 221 and a WiFi processor corresponding to the WiFi module 223) of respective processors corresponding to the cellular module 221, the WiFi module 223, the BT module 225, the GPS module 227, and the NFC module 228 may be formed as an SoC.

The RF module 229 may transmit and receive data, e.g., RF signals or any other type of electrical signal. The RF module 229 may include a transceiver, a Power Amplifier Module (PAM), a frequency filter, a Low Noise Amplifier (LNA), etc. In addition, the RF module 229 may include a component, e.g., a wire or a conductor, for transmission of electromagnetic waves in free space.

Although FIG. 2 illustrates that the cellular module 221, the WiFi module 223, the BT module 225, the GPS module 227, and the NFC module 228 share the RF module 229, at least one of these elements may perform transmission and reception of RF signals through a separate RF module.

The SIM 224 may be a card inserted into a slot formed at a certain location in the electronic device 201. The SIM 224 may include therein an Integrated Circuit Card IDentifier (ICCID) or an International Mobile Subscriber Identity (IMSI).

The memory 230 includes an internal memory 232 and an external memory 234. The internal memory 232 may include at least one of a volatile memory (e.g., a Dynamic Random Access Memory (DRAM), a Static RAM (SRAM), a Synchronous DRAM (SDRAM), etc.) or a nonvolatile memory (e.g., a One Time Programmable Read Only Memory (OTPROM), a Programmable ROM (PROM)), an Erasable and Programmable ROM (EPROM), an Electrically Erasable and Programmable ROM (EEPROM), a mask ROM, a flash ROM, a NAND flash memory, a NOR flash memory, etc.).

The internal memory 232 be a Solid State Drive (SSD).

The external memory 234 may include a flash drive, e.g., a Compact Flash (CF) drive, a Secure Digital (SD) memory card, a Micro Secure Digital (Micro-SD) memory card, a Mini Secure Digital (Mini-SD) memory card, eXtreme Digital (xD) memory card, memory stick, etc. The external memory 234 may be functionally connected to the electronic device 201 through various interfaces.

The electronic device 201 may further also a storage device or medium such as a hard drive.

The sensor module 240 may measure a physical quantity or sense an operating status of the electronic device 201, and then convert measured or sensed information into electrical signals. The sensor module 240 includes a gesture sensor 240A, a gyro sensor 240B, an atmospheric pressure (barometer) sensor 240C, a magnetic sensor 240D, an acceleration sensor 240E, a grip sensor 240F, a proximity sensor 240G, a color sensor 240H (e.g., a Red, Green, Blue (RGB) sensor), a biometric sensor 240I, a temperature/humidity sensor 240J, an illuminance sensor 240K, and an ultraviolet (UV) sensor 240M. Additionally or alternatively, the sensor module 240 may include an Electronic nose (E-nose) sensor, an ElectroMyoGraphy (EMG) sensor, an ElectroEncephaloGram (EEG) sensor, ElectroCardioGram (ECG) sensor, an InfaRed (IR) sensor, an iris scan sensor, and/or a finger scan sensor. Further, the sensor module 240 may include a control circuit for controlling one or more sensors equipped therein.

The input device 250 includes a touch panel 252, a pen sensor 254, a key 256, and an ultrasonic input device 258.

The touch panel 252 may recognize a capacitive type touch input, a resistive type touch input, an infrared type touch input, and/or an ultrasonic type touch input. In addition, the touch panel 252 may include a control circuit. For a capacitive type touch input, a physical contact or proximity input may be recognized.

The touch panel 252 may further include a tactile layer, for the touch panel 252 to provide tactile feedback to a user.

The pen sensor 254 may be formed in the same or similar manner as receiving a touch input or by using a separate recognition sheet.

The key 256 may include a physical button, an optical key, and/or a keypad.

The ultrasonic input device 258 identifies data by sensing sound waves using a microphone 288 in the electronic device 201 through an input tool that generates ultrasonic signals, thereby allowing wireless recognition.

The electronic device 201 may also receive a user input from any external device connected thereto through the communication module 220.

The display module 260 includes a panel 262, a hologram 264, and a projector 266.

The panel 262 may be a Liquid Crystal Display (LCD), an Active Matrix Organic Light Emitting Diode (AM-OLED) display, etc. The panel 262 may have a flexible, transparent or wearable form. The panel 262 may be formed of a single module with the touch panel 252.

The hologram 264 may show a stereoscopic image in the air using the interference of light.

The projector 266 may project an image onto a screen, which may be located internally or externally to the electronic device 201.

The display module 260 may further include a control circuit for controlling the panel 262, the hologram 264, and the projector 266.

The interface 270 includes a High-Definition Multimedia Interface (HDMI) 272, a Universal Serial Bus (USB) 274, an optical interface 276, and a D-subminiature (D-sub) connector 278. Additionally or alternatively, the interface 270 may include a Mobile High-definition Link (MHL) interface, an SD memory card/Multi-Media Card (MMC) interface, and/or an Infrared Data Association (IrDA) interface.

The audio module 280 may perform a conversion between sounds and electrical signals. The audio module 280 may process sound information input or output through a speaker 282, a receiver 284, an earphone 286, and/or the microphone 288.

The camera module 291 obtains still and moving images. The camera module 291 may include at least one image sensor (e.g., a front sensor or a rear sensor), a lens, an Image Signal Processor (ISP), and/or a flash (e.g., an LED or xenon lamp).

The power management module 295 may manage electrical power of the electronic device 201. For example, the power management module 295 may include a Power Management Integrated Circuit (PMIC), a charger IC, and/or a battery gauge.

The PMIC may be formed of an IC or an SoC.

Charging may be performed in a wired or wireless manner.

The charger IC may charge a battery 296 and prevent overvoltage or overcurrent from a charger. The charger IC may have a charger IC used for at least one of wired and wireless charging types. A wireless charging type may include a magnetic resonance type, a magnetic induction type, and/or an electromagnetic type. Additional circuitry for wireless charging may be further used such as a coil loop, a resonance circuit, or a rectifier.

The battery gauge may measure the residual amount of electrical power of the battery 296 and a voltage, current, or temperature during a charging process. The battery 296 may store or generate electrical power therein and supply electrical power to the electronic device 201. For example, the battery 296 may be a rechargeable battery or a solar battery.

The indicator 297 may show thereon a current status (e.g., a booting status, a message status, a recharging status, etc.) of the electronic device 201 or of its parts (e.g., the AP 210).

The motor 298 may convert an electrical signal into a mechanical vibration.

The electronic device 201 may also include a processor (e.g., a GPU) for supporting mobile TV. For example, this processor may process media data that comply with standards of Digital Multimedia Broadcasting (DMB), Digital Video Broadcasting (DVB), and/or media flow.

Each of the above-described elements of the electronic device 201 may be formed of one or more components, and its name may vary according to the type of the electronic device 201. Further, the electronic device 201 may be formed of at least one of the above-described elements, without some of illustrated elements or with additional elements. Additionally, some of the illustrated elements may be integrated into a single entity that performs the same functions as those of such elements before being integrated.

Figure 3:
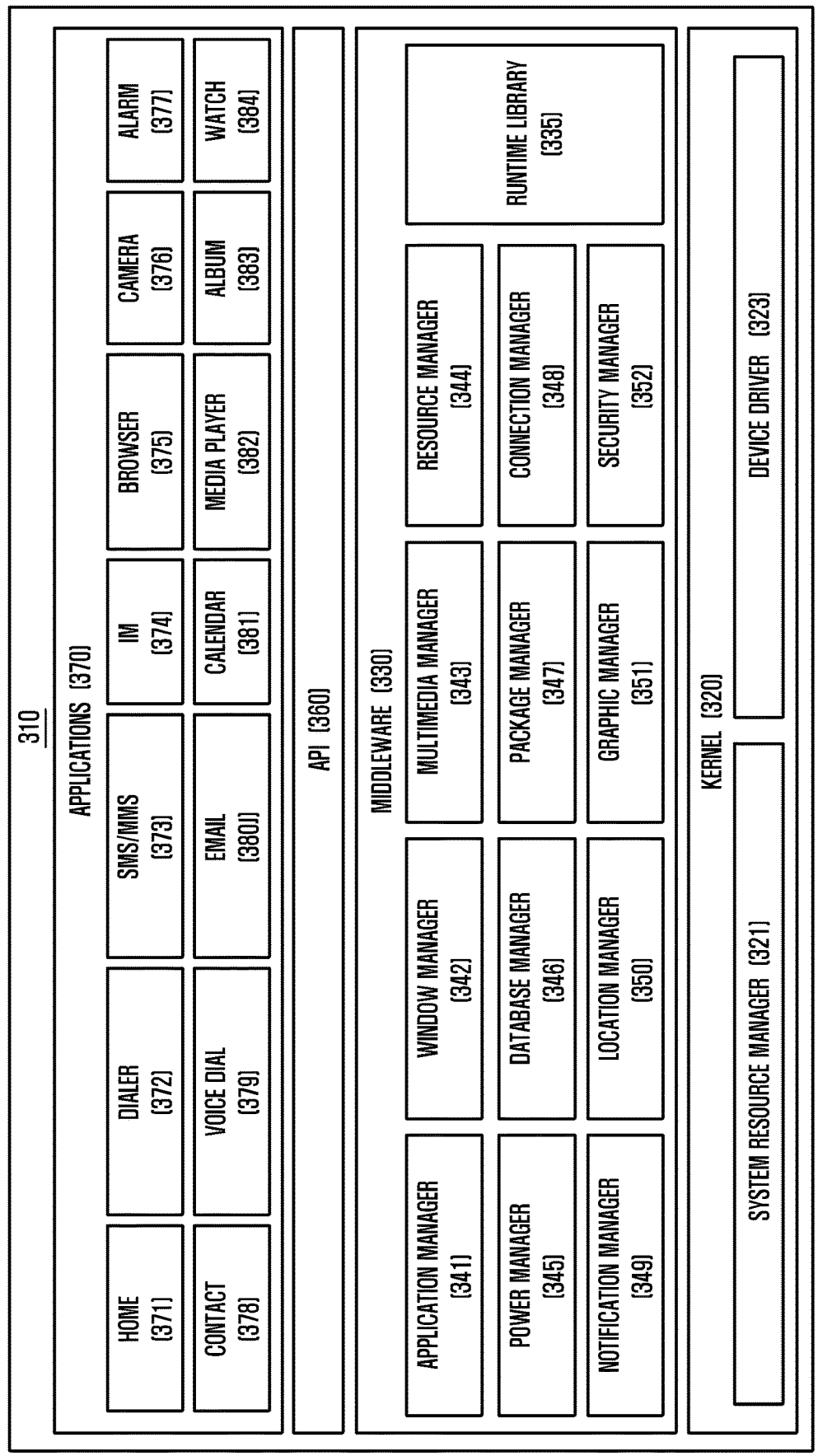
FIG. 3 illustrates a program module according to an embodiment of the present disclosure.

FIG. 3 illustrates a program module according to an embodiment of the present disclosure.

Referring to FIG. 3, the program module 310 may include an OS and/or various applications for controlling resources of an electronic device. For example, the OS may be Android®, iOS®, Windows®, Symbian®, Tizen®, or Bada®.

The program module 310 includes a kernel 320, middleware 330, API 360, and applications 370. At least one portion of the program module 310 may be preloaded in the electronic device or downloaded from an external electronic device and/or server.

The kernel 320 includes a system resource manager 321 and a device driver 323.

The resource manager 321 may control, allocate, or reclaim system resources. The system resource manager 321 may include a process manager, a memory manager, and/or a file system manager.

The device driver 323 may include a display driver, a camera driver, a Bluetooth driver, a shared memory driver, a USB driver, a keypad driver, a WiFi driver, an audio driver, or an Inter-Process communication (IPC) driver.

The middleware 330 may provide functions commonly required for the applications 370 or various functions through the API 360 so that applications 370 can use limited system resources in the electronic device. The middleware 330 includes a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352.

The runtime library 335 may include a library module which is used by a compiler to add a new function while the applications 370 are being executed. The runtime library 335 may perform an input/output management, memory management, and/or arithmetic function processing.

The application manager 341 may manage a life period of the applications 370.

The window manager 342 may manage Graphic User Interface (GUI) resources used for a screen.

The multimedia manager 343 may identify a format for playing media files and perform encoding or decoding of the media files by using a codec suitable for the corresponding format.

The resource manager 344 may manage a source code of the applications 370 or a memory space.

The power manager 345 may manage a capacity or a power of a battery and provide information for the operation of the electronic device. For example, the power manager 345 may be synchronized with a Basic Input Output System (BIOS).

The database manager 346 may generate, search, and/or modify a database to be used by the applications 370.

The package manager 347 may install or update an application distributed in a package file form.

The connection manager 348 may manage a wireless connection.

The notification manager 349 may notify an event to a user, such as a message arrival, an appointment, and a proximity notification.

The location manager 350 may manage location information of the electronic device.

The graphic manager 351 may manage a graphic effect to be provided for a user or a related user interface.

The security manager 352 may provide system security and/or user authentication.

The middleware 330 may also include a telephony manager for managing a voice or video telephony function of the electronic device, or a middleware module for forming a combination of functions for the above components.

The middleware 330 may also provide a module specialized according to the type of OS used.

The middleware 330 may dynamically delete a portion of the existing components or add a new component.

The API 360 is a set of API programming functions, and can be provided in various configurations according to the OS. For example, when using Android® or iOS®, an API set may be provided for each platform, and when using Tizen®, more than one API set can be provided for each platform.

The applications 370 include a home application 371, a dialer application 372, a Short Message Service/Multimedia Messaging Service (SMS/MMS) application 373, an Instant Message (IM) application 374, a browser 375, a camera application 376, an alarm application 377, a contact application 378, a voice dial application 379, an email application 380, a calendar application 381, a media player application 382, an album application 383, and a watch application 384. Additionally, the applications 370 may include a health care application (e.g., an application that monitors movement or a blood sugar level) and/or an environment information application (e.g., an air pressure, humidity, and/or temperature information application).

The applications 370 may also include an information exchange application that supports an information exchange between the electronic device and an external electronic device. The information exchange application may include a notification relay application for transferring specific information to the external electronic device or a device management application for managing the external electronic device. The notification relay application can transfer notification information generated by another application of the electronic device to the external electronic device, and provide notification information received from the electronic device for a user. The device management application may control a turn-on/off function of an external electronic device (e.g., an external electronic device itself or its partial components) communicating with the electronic device or an adjustment of a brightness or a resolution of a display, and may install, uninstall, and/or update an application operating in the external electronic device.

The applications 370 may also include an application corresponding to an attribute of the external electronic device (e.g., a health care application for an external electronic device that is a type of mobile medical equipment).

The applications 370 may be received from an external electronic device and/or server.

At least a portion of the program module 310 may be executed with at least two of software, firmware, and hardware, and may include a module, program, routine, command set, etc., or may process to perform at least one function.

Figure 4:
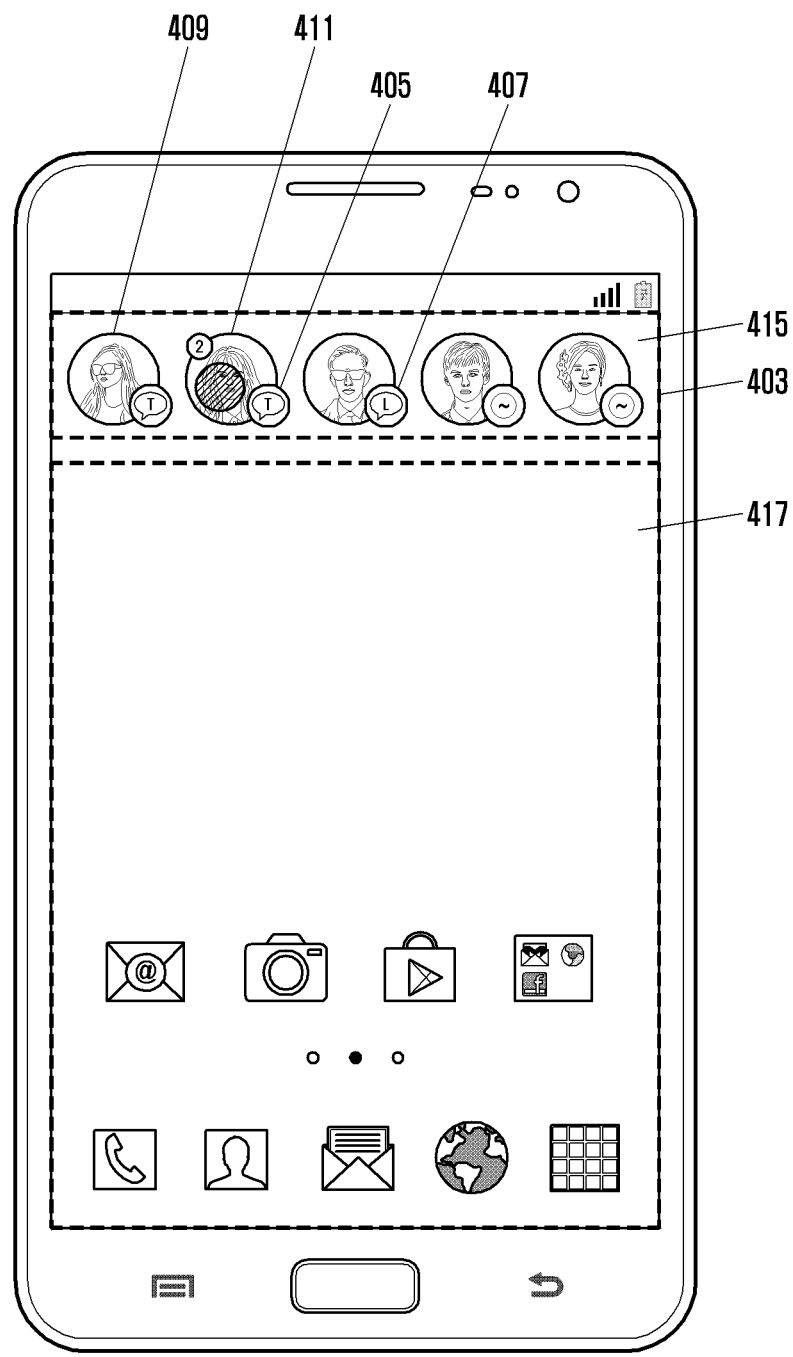
FIG. 4 illustrates a user interface in an electronic device according to an embodiment of the present disclosure.

FIG. 4 illustrates a user interface in an electronic device according to an embodiment of the present disclosure.

Referring to FIG. 4, a user interface 401 displayed on a display of the electronic device includes a home screen including objects (e.g., icons) for executing a specific application such as an email application, a camera application, an application store application, a phone application, a content application, a message application, and an Internet application.

An App bar 403 is also displayed to provide information related to various applications. The App bar 403 may display information related to at least one application installed or being executed in the electronic device 201.

A representation indicating an application may be displayed in the App bar 403. For example, the App bar 403 displays a first application representation 405 indicating a first application (for example, a first messenger) and a second application representation 407 indicating a second application (for example, a second messenger).

The App bar 403 also displays different user representations for distinguishing different users, even though the users may be using identical applications. For example, the App bar 403 displays a first user representation 409 (for example, a photo, telephone number, name, or current emotion state) indicating a first user of the first application and a second user representation 411 indicating a second user of the first application.

The App bar 403 may also display an event generated by an application. For example, if a new event is generated related to the second user of the first application, the App bar 403 displays an object indicating the generation of the event with the first application representation 405 or the second user representation 411. When two messages are newly received from the second user using the first application, the App bar 403 displays an object 417 in the vicinity of the second user representation 411 indicating that the two messages have been received from the second user via the first application.

The App bar 403 may be displayed in a specific area of the user interface 401. For example, the App bar 403 may be displayed in a subarea 415, where a user input is received independently from the main area 413 of the user interface 401. The position of the subarea 403 may vary according to a user setting, body information of the user (for example, the length of a user's finger), environment information of the electronic device, and/or physical characteristics of the electronic device (e.g., a size or shape of the display of the electronic device). The App bar 403 may also be disable from the user interface 401 according to a user setting.

Figure 5:
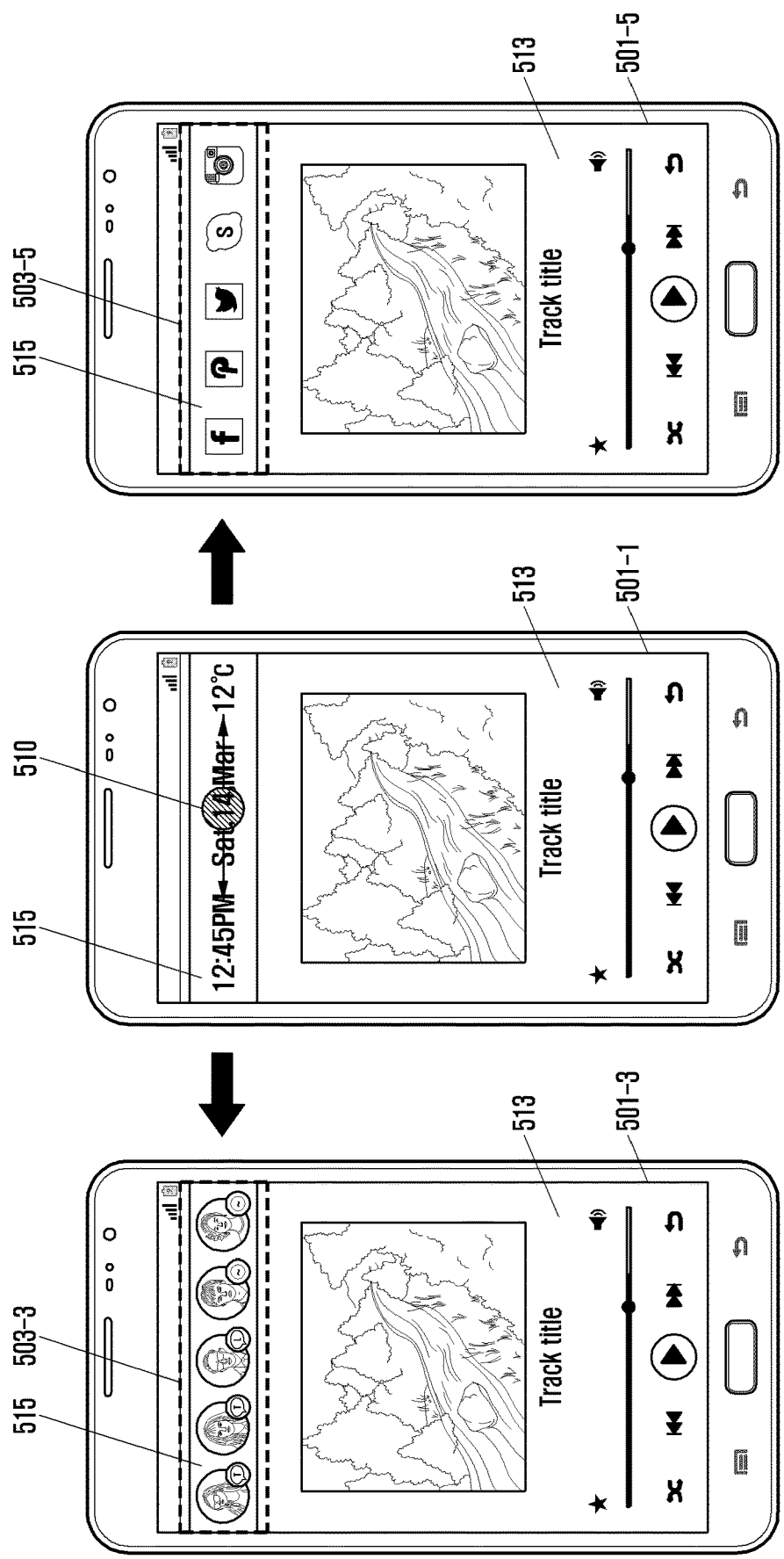
FIG. 5 illustrates a user interface for providing additional information of an application (App) bar according to an embodiment of the present disclosure.

FIG. 5 illustrates a user interface for providing additional information of an App bar according to an embodiment of the present disclosure.

Referring to FIG. 5, information is displayed in a subarea 515 of a first user interface 501-1 differently from a main area 513. For example, the App bar may be hidden in the subarea 515, while a status bar indicating basic information of the electronic device (for example, current time, date, temperature, residual battery amount) is displayed, and an execution screen of a main application currently being executed in the electronic device is displayed in the main area 513. Although not illustrated in FIG. 5, the execution screen of the main area 513 can be extended to the subarea 515 as basic information.

According to an attribute of a user input detected through the subarea 515 while the App bar is hidden, another App bar including different application information may be displayed in the subarea 515. For example, if a movement direction of the user input is a first direction (for example, rightward direction), a first App bar 503-3 is displayed, and if the movement direction of the user input is a second direction (for example, leftward direction), a second App bar 503-5 is displayed. Alternatively, the attribute of the user input may include a touch intensity, a touch time, and different touch types, such as a drag, tap, swipe, flicker, etc.

The first App bar 503-3 includes different user representations for distinguishing different users, identifications of the applications used by the different users, and notification objects, e.g., as illustrated in the App bar 403 of FIG. 4.

The second App bar 503-5 includes icons for executing various applications.

Although the user input 510 is detected in the subarea 515, the execution screen of the main area 513 may be maintained.

The electronic device may also provide various visual effects according to the attribute of the user input. For example, if the intensity of the user input is a first intensity, an object or an image of an area corresponding to the user input may be displayed in a wave form. As another example, the electronic device may provide feedback by using colors, transparency, vibrations, and/or haptic functions based on the user input.

1. Additional Information Function

Figure 6B:
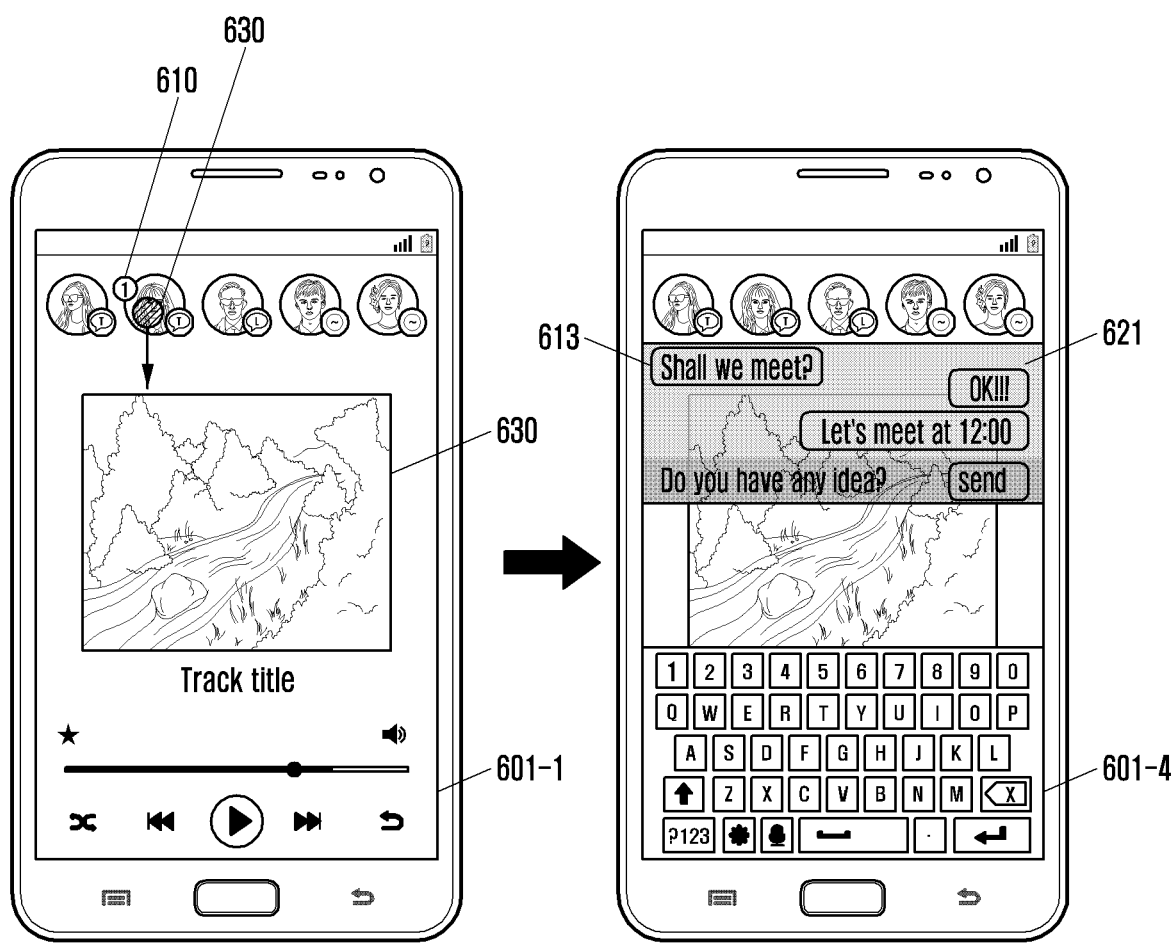
FIG. 6B illustrates a user interface for providing additional information of an App bar according to an embodiment of the present disclosure.

FIGS. 6A and 6B illustrate a user interface for providing additional information of an App bar according to an embodiment of the present disclosure. For example, FIGS. 6A and 6B illustrate screen examples providing different additional information of an object corresponding to a user input detected through an App bar 603.

Referring to FIG. 6A, a notification 610-1 for notifying generation of an event to a first object 610 (for example, a user representation) is displayed in a first user interface 601-1. When a user input 611 for selecting the first object 610 is detected, information related to the notification 610-1 is provided in a second user interface 601-3 as additional information of the first object 610. For example, the notification 610-1 indicates that a message is received from a first user of the first application, and content 613 of the message is displayed as the information related to the notification.

When displaying the content 613 of the message, other objects located around the first object 610, such as a second object 617 and a third object 619 are relocated at an outer side of the second user interface 601-3 in order to provide a display area for the content 613 of the message. Alternatively, the content 613 of the message may overlap the second object 617 and/or on the third object 619, without relocating the second object 617 and the third object 619.

When a user input 615 for selecting the content 613 of the message is received from on the second user interface 601-3, the electronic device displays, in a third user interface 601-5, an area 621 to provide a function for transmitting a message to the first user (for example, a reply) based on the user input 615. As illustrated in FIG. 6A, the area 621 may be provided as a drop down window, without directly entering a corresponding application, such that the application operating on the main display can continue to be displayed.

A virtual keyboard 623 is also displayed with the object 621 in the third user interface 601-5.

In order not to interfere with the display of the main area, the area 621 and/or the virtual keyboard 623 may be displayed in an adjustable semi-transparent form. For example, the area 621 and/or the virtual keyboard 623 may have a transparency that is adjustable from a completely opaque level to a completely transparent level.

The first user input 611 and the second user input 615 may have a first attribute. For example, the first user input 611 may be a touch input generated by tapping the first object 610, and the second user input 615 may be a touch input generated by tapping the content 613 of the message.

Referring to FIG. 6B, when a user input 630 for selecting the first object 610 is received on the first user interface 601-1, the electronic device directly displays the area 621 for providing a reply function including the content 613 of the message in a second user interface 601-4 responding to the user input 630. An attribute of the user input 630 may be different from the attribute of the user input 611. For example, the user input 630 is a touch input of the first object 610 while swiping vertically downwards.

Alternatively, the electronic device may execute a corresponding application as a main application, and accordingly, an execution screen of the corresponding application can be displayed in the main area.

As described above, in FIG. 6A, the electronic device first displays the content 613 of the message responding to the user input 611, e.g., a tap input, and then displays the area 621 in the main area in response to an additional user input 615, e.g., another tap input. However, in FIG. 6B, the electronic device simultaneously displays the content 613 and the area 621 in the second user interface 601-4 responding to the user input 630, e.g., a swipe input.

Although FIGS. 6A and 6B illustrate providing additional information for an IM application, the present disclosure is not limited to this example, and additional information related to other application, e.g., a web browser application, a telephone application, a game application, etc., can also be provided.

2. Multitasking Function

According to an embodiment of the present disclosure, an electronic device may dispose a first execution screen over a second execution screen or may dispose the first execution screen under the second execution screen according to a user input of selecting the first execution screen or the second execution screen. Further, an application of an execution screen disposed at the top may have a higher priority than an application of an execution screen disposed at the bottom. For example, if a user input is received from an overlapped area between the first execution screen and the second execution screen, the electronic device may identify a user input for an application corresponding to the execution screen disposed at the top. The electronic device may identify a user input received in an area in which the execution screens are not overlapped as an input of the corresponding application.

Figure 7A:
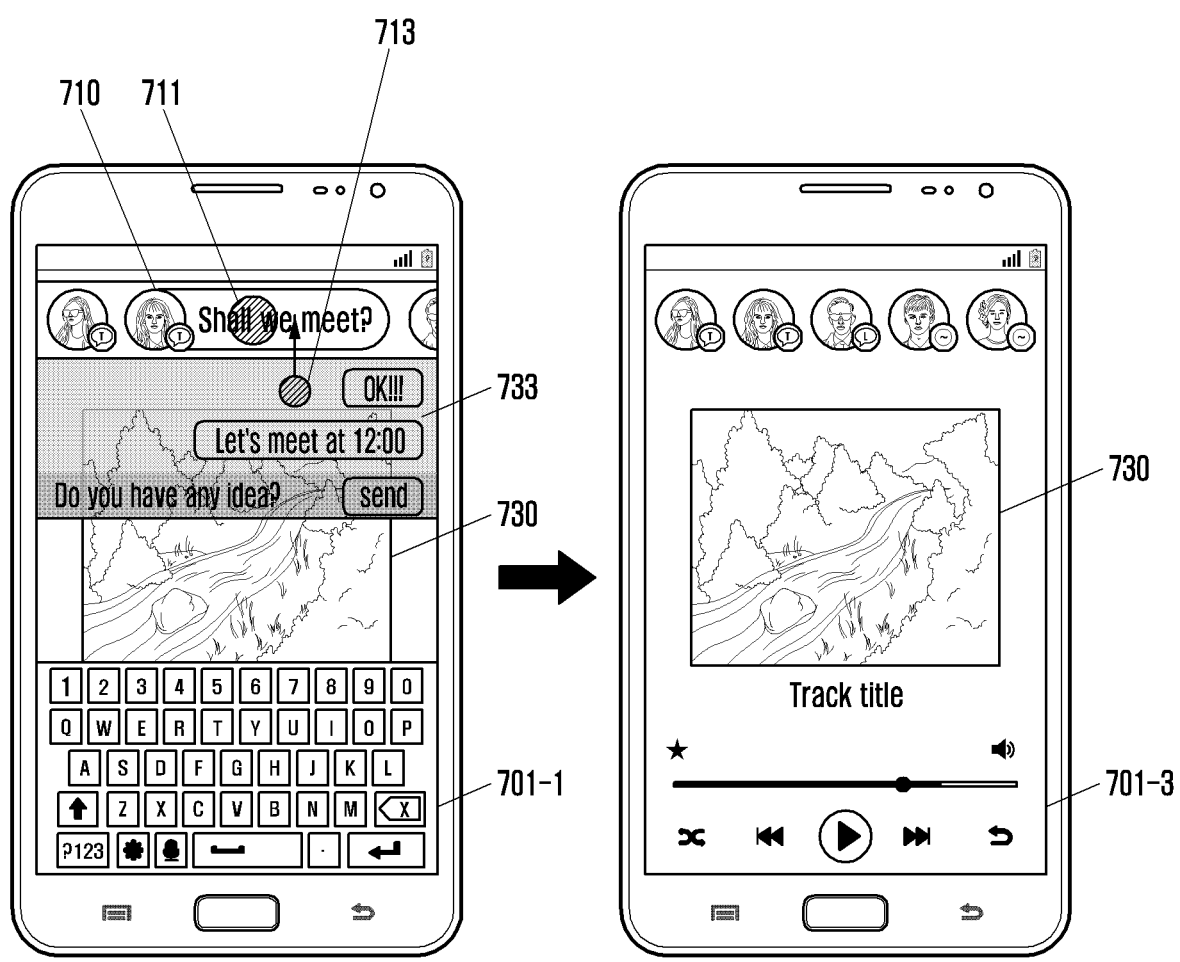
FIG. 7A illustrates a user interface for providing additional information of an App bar according to an embodiment of the present disclosure.
Figure 7B:
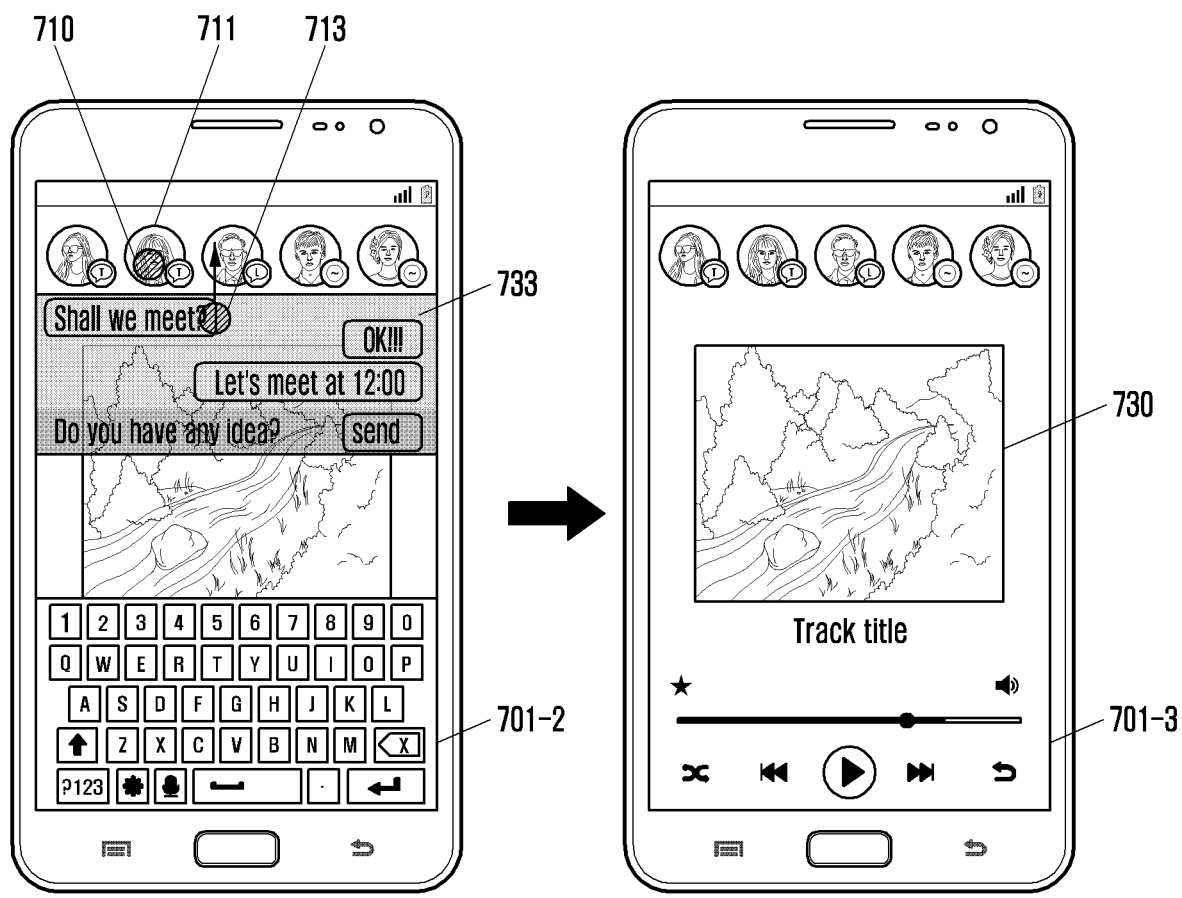
FIG. 7B illustrates a user interface for providing additional information of an App bar according to an embodiment of the present disclosure.

FIGS. 7A and 7B illustrate a user interface for providing additional information of an App bar according to an embodiment of the present disclosure. Specifically, FIGS. 7A and 7B illustrate a user interface for terminating a multitasking operation.

Referring to FIG. 7A, the electronic device displays a first execution screen 730 and a second execution screen 731 in a first user interface 701-1. The first execution screen 730 provides a main application (for example, a music plyer), and the second execution screen 733 an provides a reply function for a message displayed in the main area according to a previous user input for selecting a message content of a first object 710 from an App bar.

When a tap user input 711 is received in an area related to the first object 710 or a vertical swipe up user input 713 is received in the second execution screen 733, the electronic device hides the second execution screen 733 from the first user interface 701-1. For example, the electronic device removes the second execution screen 733 from the first user interface 701-1, and displays the first execution screen 730 in a second user interface 701-3.

Referring to FIG. 7B, when the tap user input 711 is received on the first object 710 or a vertical swipe up user input 713 is received in the second execution screen 733, the electronic device removes the second execution screen 733 from the first user interface 701-2. As illustrated in the second user interface 701-3, the electronic device displays the first execution screen 730 in the main area and the App bar in a subarea.

Alternatively, the user input for hiding the second execution screen 733 may include different inputs of various methods.

3. Application Switching Function

FIG. 8 illustrates a user interface for providing an application switching function using an App bar in an electronic device according to an embodiment of the present disclosure.

According to an embodiment of the present disclosure, an electronic device may change an application being executed at the topmost level based on user input received through an App bar. Generally, in order to change a first application displaying an execution screen at a topmost level in a main area, an electronic device receives a first user input for switching a first application to a background program (for example, a user input pressing a home screen button) and then receives a second user input selecting an icon corresponding to a second application from a home screen (or from a screen arranged with application icons). However, an electronic device may change a foreground program from a first application to a second application in response to a single user input selecting the second application in the App bar.

Referring to FIG. 8, a first user interface 801-1 is a home screen including objects for executing corresponding applications. When the electronic device receives a first user input 835 for selecting an object 833, the electronic device displays an execution screen of an application corresponding to the object 833 in a main area through a second user interface 801-3.

In the second user interface 801-3, the electronic device also displays an App bar 837 in a subarea. Applications having a similar type to the application currently being executed, applications frequently accessed by a user, and/or applications designated by the user may be included in the App bar 837. Alternatively, the App bar 837 may not include an object corresponding to the application currently being executed.

A background color of the subarea may also represent the application currently being executed in the electronic device. For example, if the application being executed has a representative color of blue, the background of the App bar 837 may then have an identical or similar color blue.

When a user input 839 is received for selecting an object corresponding to a second application in the App bar 837, the electronic device switches a foreground program from the first application to the second application in a third user interface 801-5.

Further, the background color of the App bar 837 can also be changed to a color representative of the second application.

Additionally, when the foreground program changes from the first application to the second application, an icon 841 corresponding to the first application is added to the App bar 837.

Further, when the second application becomes the foreground program, an icon of the second application may be removed from the App bar 837.

4. Screen Control Function of Main Application/Main Area

As illustrated in FIGS. 6A to 8, an electronic device according to an embodiment of the present disclosure can control a screen of a main area in response to a user input received through an App bar. Further, the electronic device can control a main application by changing the main application being executed in the main area responding to the user input.

Alternatively, when an application is executed as a main application, a menu item of the executed application can be displayed in the App bar. For example, when a telephone function is executed, the electronic device may display menu items for controlling the telephone function, such as contacts, recent records, bookmarks, and/or a keypad, in the App bar. As another example, when a camera function is being executed, the electronic device may display a preview button, mode change button, and/or shutter button in the App bar in order to control the camera function.

5. Data Sharing Function

According to an embodiment of the present disclosure, an electronic device may reduce unnecessary steps and intuitively share data of various applications with various users by using an App bar.

Figure 9A:
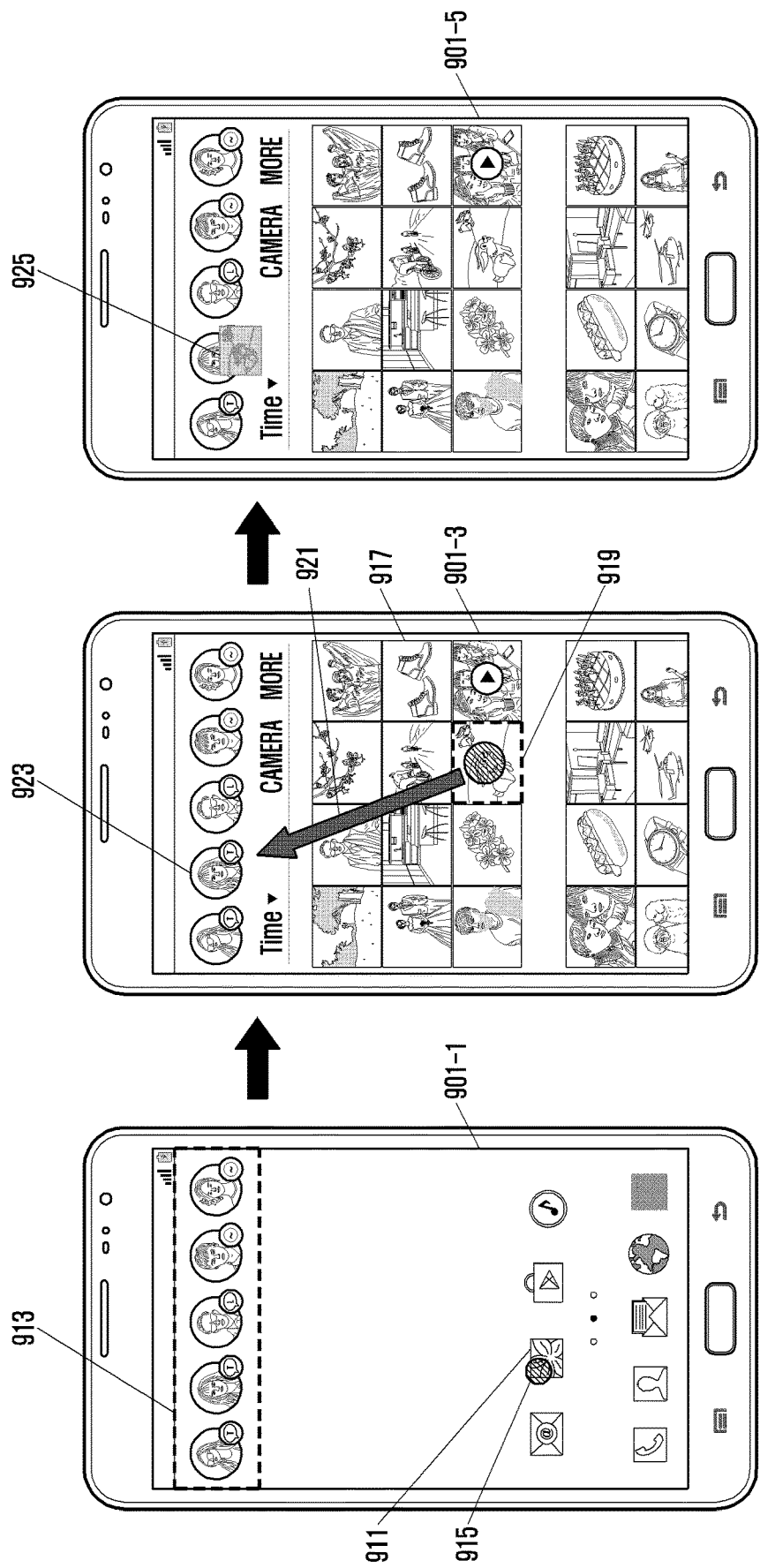
FIG. 9A illustrates a user interface for sharing image data using an App bar according to an embodiment of the present disclosure.

FIG. 9A illustrates a user interface for sharing image data using an App bar according to an embodiment of the present disclosure.

Referring to FIG. 9A, an electronic device displays a first user interface 901-1 (for example, a home screen) including various objects for executing functions or applications, and an App bar 913 including a plurality of objects providing various message information received from various persons.

When a user input 915 for selecting an object 911 (for example, a gallery) is received, the electronic device displays a second user interface 901-3 including an execution screen 917 of an application corresponding to the object 911. The execution screen 917 includes one or more objects which can be individually selected, e.g., images obtained through a camera of the electronic device and/or images received from another electronic device, server, and/or web page.

When a user input 921 for selecting an object 919 is received, e.g., a user input dragging the object 919 to a target object 923 of the App bar 913, the electronic device displays a third user interface 901-5 providing an animation effect 925 representing the moving the object 919 to a location of the target object 923. The target object 923 may be an object that can provide a notification of a message received from a specific user through a specific messenger. The animation effect 925 may include an image identical or similar to the object 919. Additionally or alternatively, the animation effect 925 may include an image having a transparency different from that of the object 919.

Figure 9B:
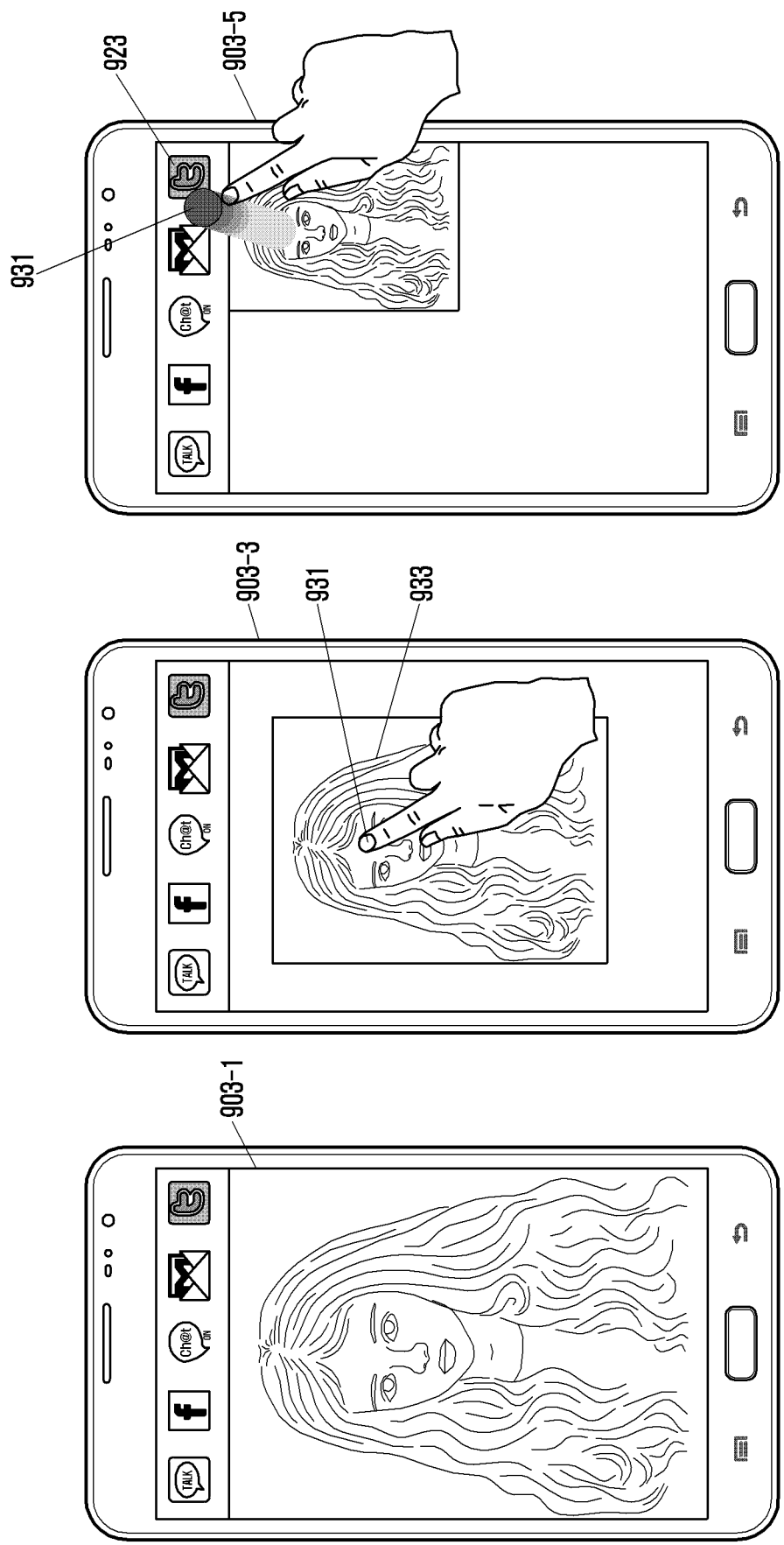
FIG. 9B illustrates a user interface for sharing image data using an App bar according to an embodiment of the present disclosure.

FIG. 9B illustrates a user interface for sharing image data using an App bar according to an embodiment of the present disclosure.

Referring to FIG. 9B, an electronic device displays an image to be shared through a user interface 903-1, and displays a user interface 903-3 with a reduced image size, in response to a user input 931 for selecting the image.

As the user input 931 moves the image towards the target object 933 in the App bar, the electronic device provides an effect of gradually reducing the size of the image. When the image approaches the target object 923 or at least a portion of the image overlaps the target object 923, the electronic device may share the image with a user corresponding to the target object 923. For example, a user's electronic device corresponding to the target object 923 may receive the image.

As described above, when sharing data, e.g., an image, with a person through a messaging application, the electronic device may directly share the image through the App bar, without executing the messaging application on the main area.

Additionally, the method of sharing data corresponding to an object may differ according to an attribute of the target or the object itself. For example, if the target object is a web browser related to a social networking service (SNS), the electronic device may post the object in the web browser.

Figure 10:
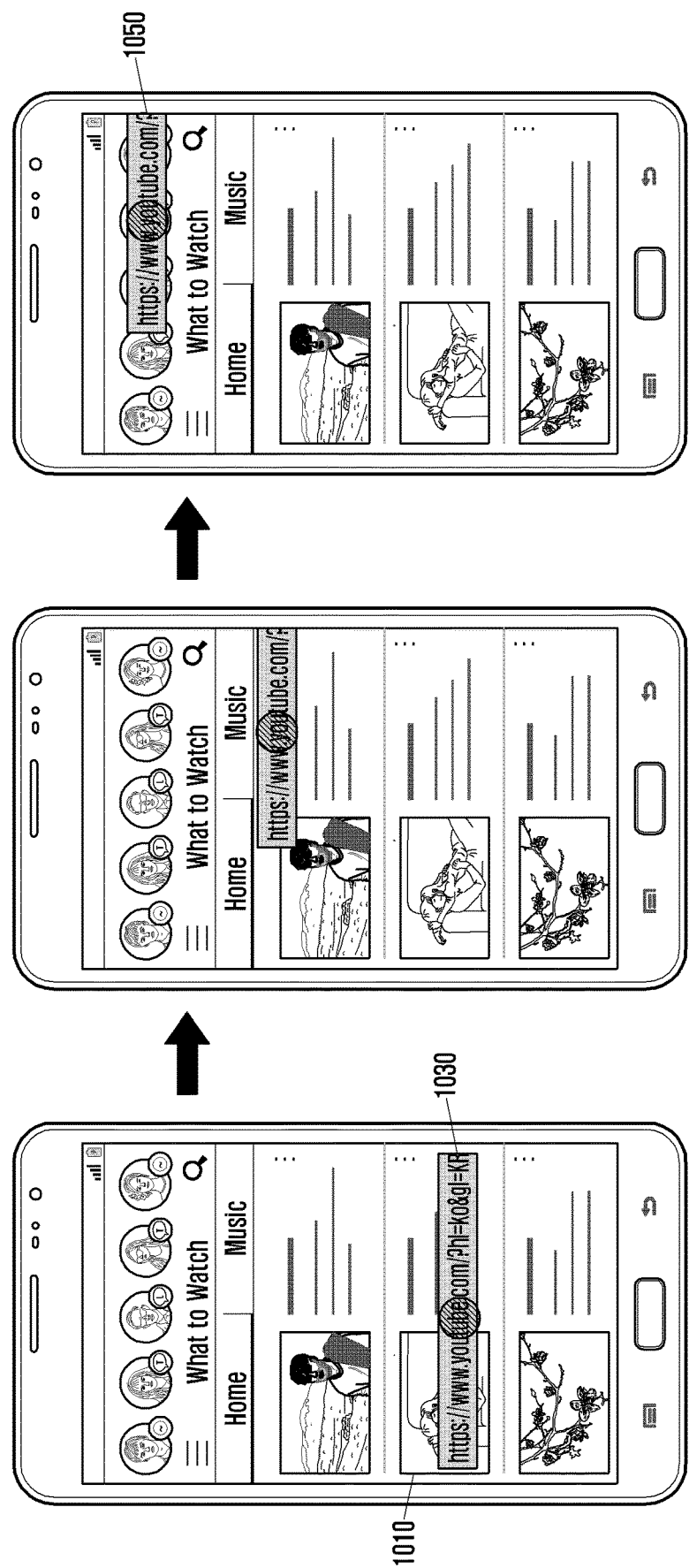
FIG. 10 illustrates a user interface for sharing data using an App bar according to an embodiment of the present disclosure.

FIG. 10 illustrates a user interface for sharing data using an App bar according to an embodiment of the present disclosure.

Referring to FIG. 10, when an object to be shared is content 1010 posted in a web browser, the electronic device can share a Universal Resource Locator (URL) 1030 corresponding to the content 1010 with another electronic device or web browser through a target object 1050 of an App bar.

6. Subarea Screen Switching Function

Figure 11:
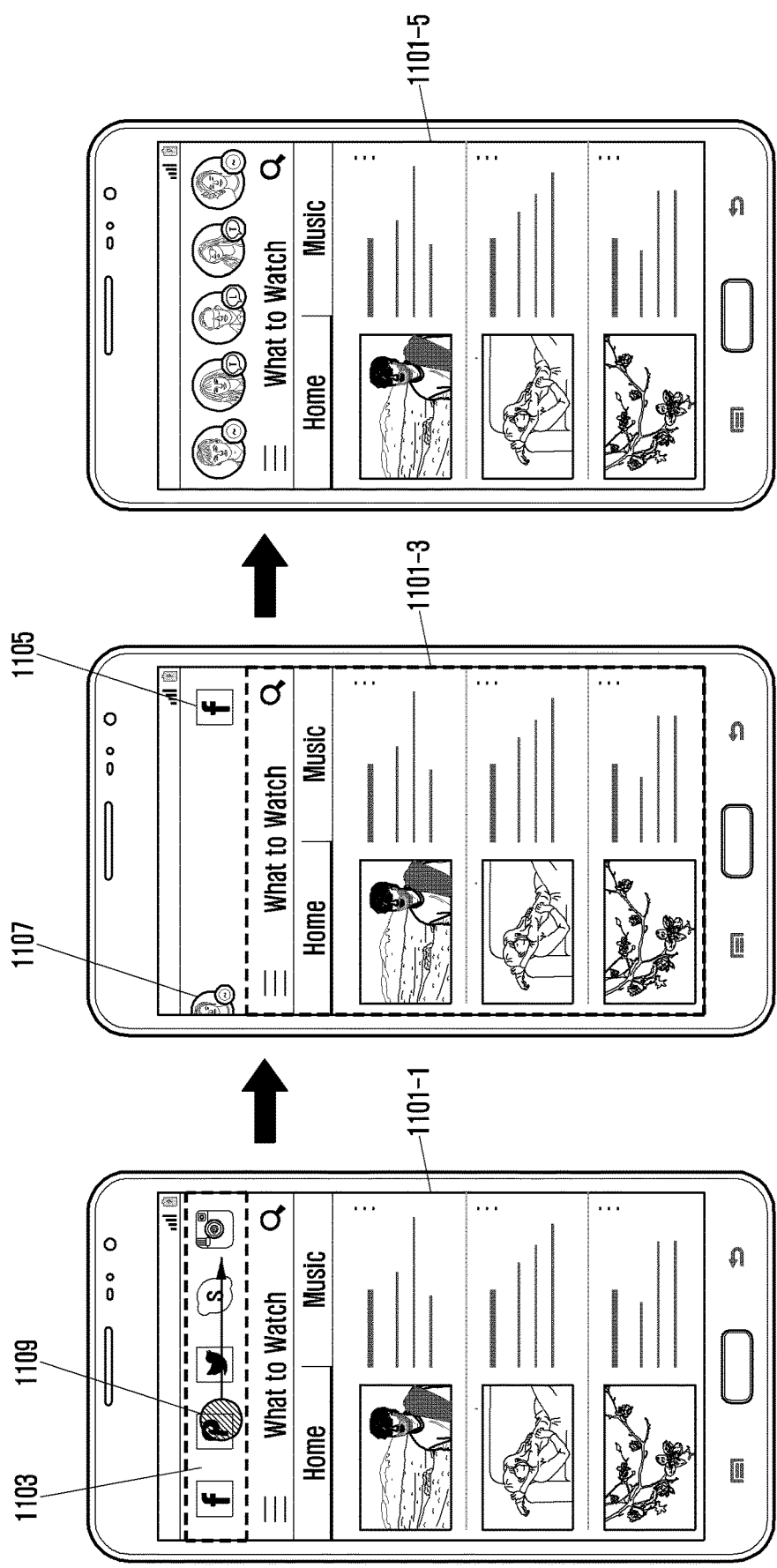
FIG. 11 illustrates a user interface for providing a screen switching function in a subarea using an App bar according to an embodiment of the present disclosure.

FIG. 11 illustrates a user interface for providing a screen switching function in a subarea using an App bar according to an embodiment of the present disclosure.

Referring to FIG. 11, an electronic device provides a first user interface 1101-1 displayed with an App bar including a plurality of objects in the subarea 1103. When a user input 1109 dragging the subarea 1103 to a first direction (for example, rightward direction) is received, the electronic device switches over at least a portion of the screen of the subarea 1103 independently from an execution screen of a main area 1109, as illustrated in a second user interface 1101-3. For example, in response to the user input 1109, the electronic device may shift the App bar corresponding to the movement direction of the user input 1109, such that a plurality of objects gradually disappear from the subarea 1103. The plurality of objects may include representations corresponding various types of applications.

When the last object 1105 is shifted off of or located at the last position of the subarea 1103, the electronic device may display a first object 1107 among a plurality of new objects in the subarea 1103. When displaying the first object 1107 of the plurality of new objects in the subarea 1103, the last object 1105 of previous objects can be also displayed in the subarea 1103 at least for a moment.

As illustrated in a third user interface 1101-5, the electronic device may continue to shift the plurality of new objects in response to the user input 1109, until all of the plurality of new objects are displayed in the subarea 1103.

Although FIG. 11 illustrates an example of the user input 1109 having a specific direction, the movement direction of the user input 1109 is not limited thereto, and may move right, left, up, and down. Accordingly, the electronic device may display different objects in the subarea 1103 according to the movement directions of the user input.

Although descriptions for a plurality of objects have been made for the convenience, one object can also be displayed in the subarea 1103.

An electronic device according to an embodiment of the present disclosure may also change a screen of a subarea according to an execution screen in a main area. For example, in order to provide an image feeling of perceptional depth and immersion for a user by synchronizing with the execution screen of the main area, the electronic device 201 may process the sub area to be relatively blurred as compared with the main area.

7. Notification Providing Function

Figure 12:
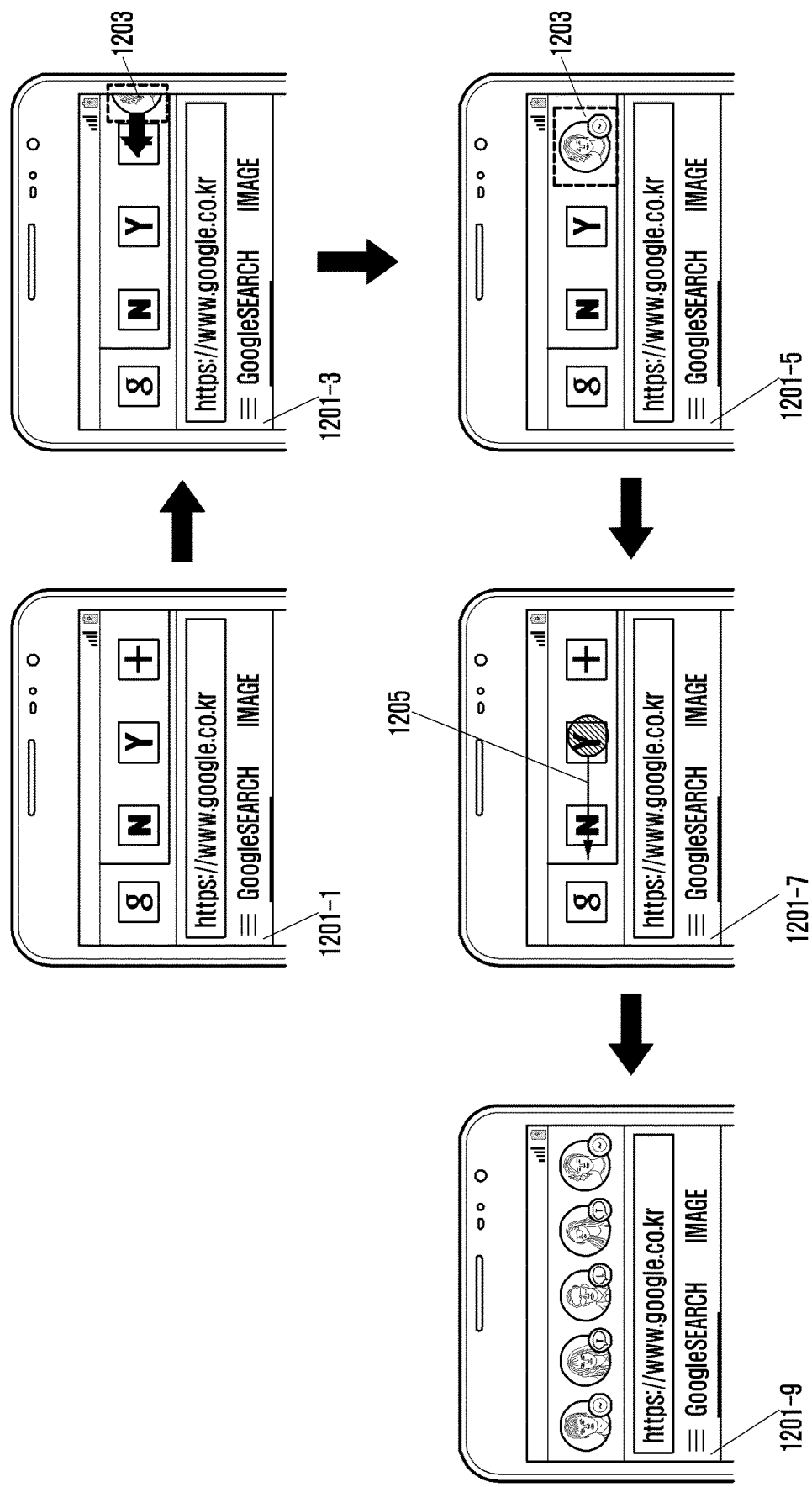
FIG. 12 illustrates a user interface for displaying a notification of a new event through an App bar according to an embodiment of the present disclosure.

FIG. 12 illustrates a user interface for displaying a notification of a new event through an App bar according to an embodiment of the present disclosure.

Referring to FIG. 12, in a first user interface 1201-1, an electronic device displays, in a subarea, objects corresponding to an application recently used by a user.

As illustrated in a second user interface 1201-3, when a new event is generated through another application, to notify the new event, the electronic device controls an object 1203 corresponding to the another application (for example, an object hidden in the subarea) to be gradually revealed from a side of the subarea.

In a third user interface 1201-5, the object 1203 is completely displayed in the subarea.

After completely displaying the objects 1203 in the subarea for a certain amount of time, the electronic device may remove the object 1203 from the subarea, e.g., by gradually moving the object 1203 off of a side of the display.

When a user input 1205 for moving the App bar to a first direction is received, as illustrated in a fourth user interface 1201-7, the electronic device displays a plurality of objects including the notified object 1203 in the subarea, as illustrated a fifth user interface 1201-9.

8. Synchronized Device Control Function

FIGS. 13 to 16 illustrate user interfaces for providing a synchronization function using an App bar according to embodiments of the present disclosure.

Figure 13:
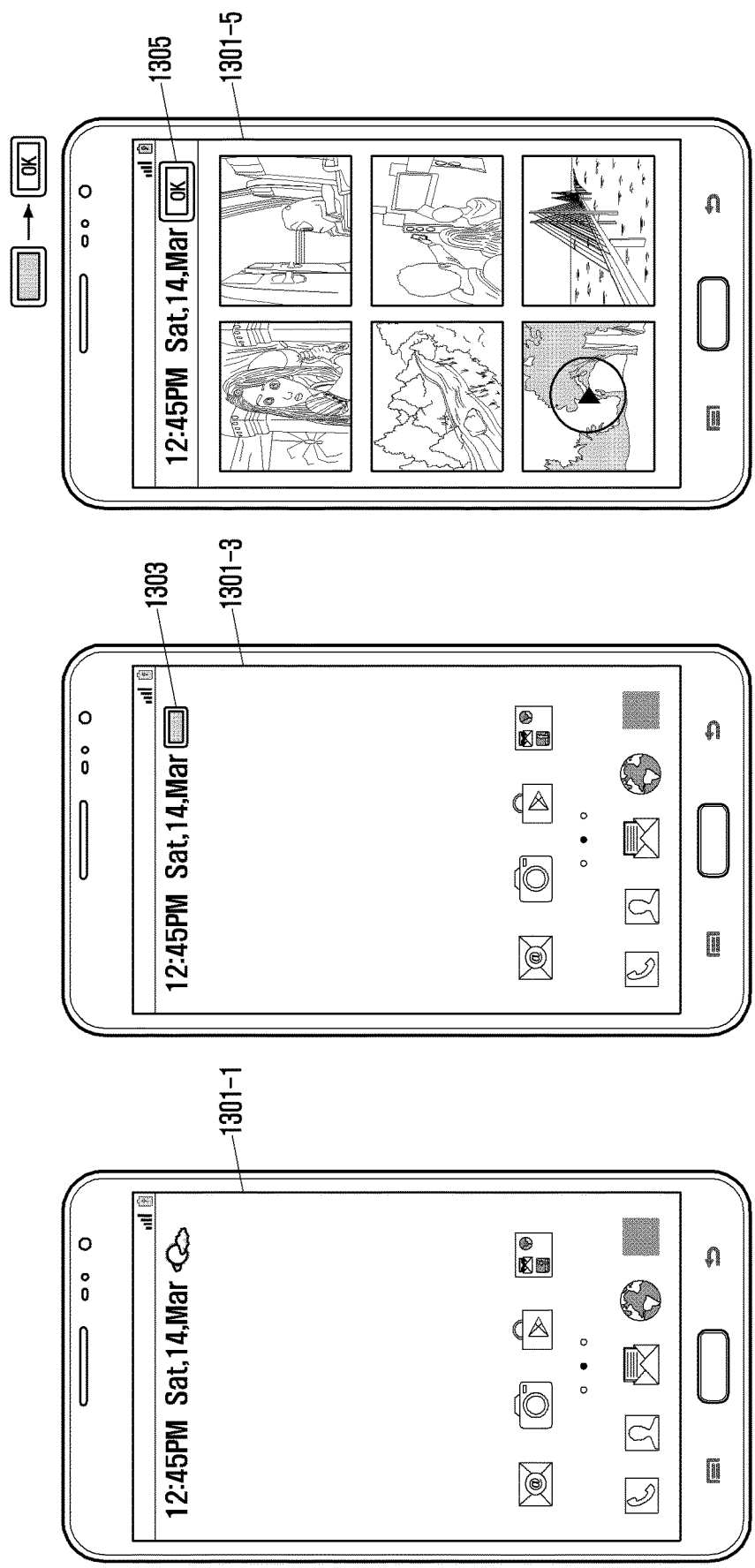
FIG. 13 illustrates a user interface for providing a synchronization function using an App bar according to an embodiment of the present disclosure.

Referring to FIG. 13, when a device that can be synchronized with an electronic device (hereinafter "a synchronized device") is not detected or a synchronization function is switched off, the electronic device provides basic information in the App bar, as illustrated in a first user interface 1301-1.

When synchronization function is switched on and a synchronized device is located near by the electronic device, i.e., with a communication range for synchronization, the electronic device displays an object 1303 notifying of the synchronized device in the App bar. The object 1303 of the synchronized device may include an image, text, form, color, and/or shape that indicates the synchronized device.

When the electronic device may share content stored therein with the synchronized device, e.g., when a user of the electronic device authorizes sharing or the electronic device automatically recognizes the synchronized device as being authorized for sharing, the electronic device changes the object 1303 displayed in the App bar to another object 1305.

For example, at least a portion of the another object 1305 may a different color, shape, form, text, and/or transparency than the object 1303.

Figure 14:
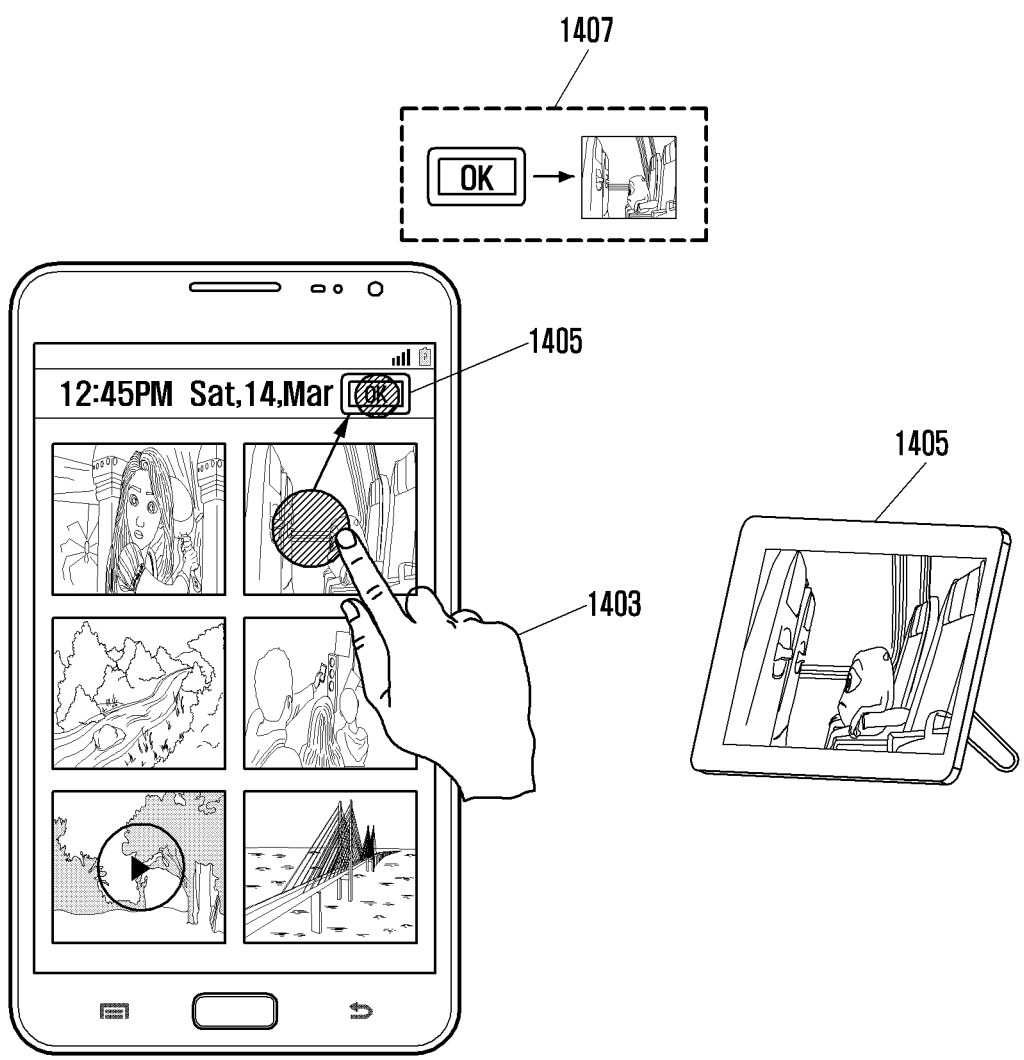
FIG. 14 illustrates a user interface for providing a synchronization function using an App bar according to an embodiment of the present disclosure.

Referring to FIG. 14, when a user input 1403 for moving selected content to the object 1405 is received, the electronic device transmits the content to the synchronized device 1450. As illustrated in the enlarged view 1407, the electronic device may display the content being played by the synchronized device 1450 through the object 1405. For example, the electronic device may display a specific image of the content through the area of the object 1405 or a corresponding frame of the content being played.

Figure 15:
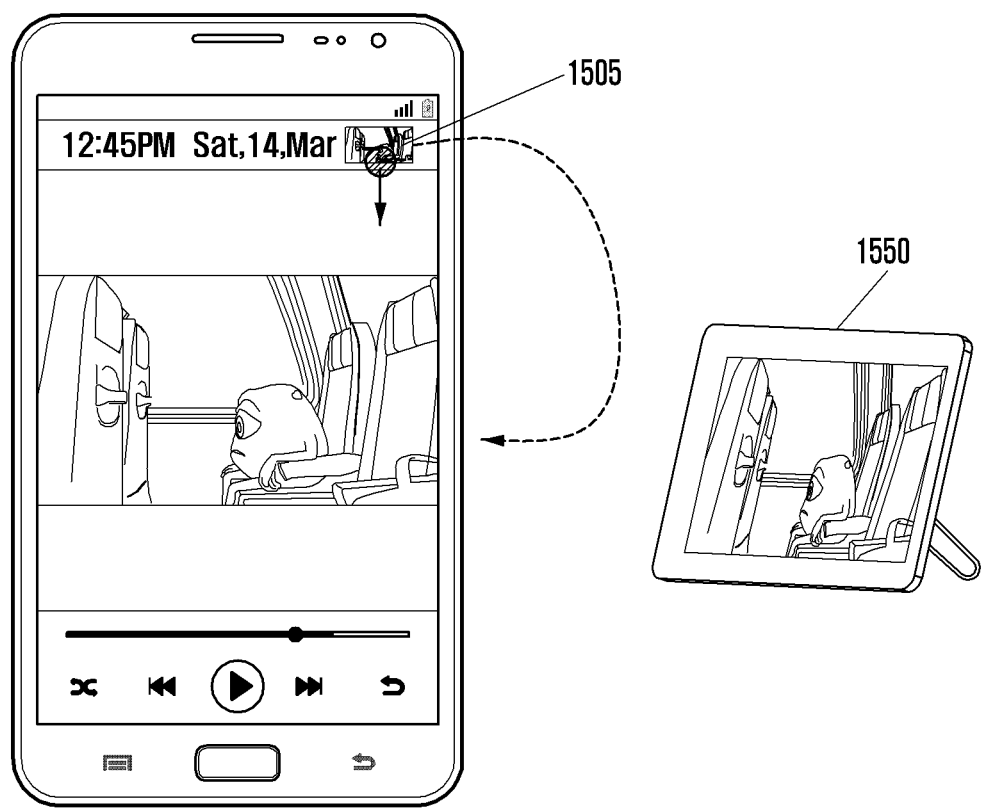
FIG. 15 illustrates a user interface for providing a synchronization function using an App bar according to an embodiment of the present disclosure.

Referring to FIG. 15, when a user input 1505 dragging content being displayed through an object to a main area is received, the electronic device may display the content through the main area of the electronic device. Namely, the electronic device may output a screen on the main area of the display of the electronic device corresponding to the content be played in the synchronized device 1550. Additionally, based on the user input 1505, the electronic device may stop the content from being played in the synchronized device 1550, while continuing to play the content on the electronic device or pausing the playing of the content.

Figure 16:
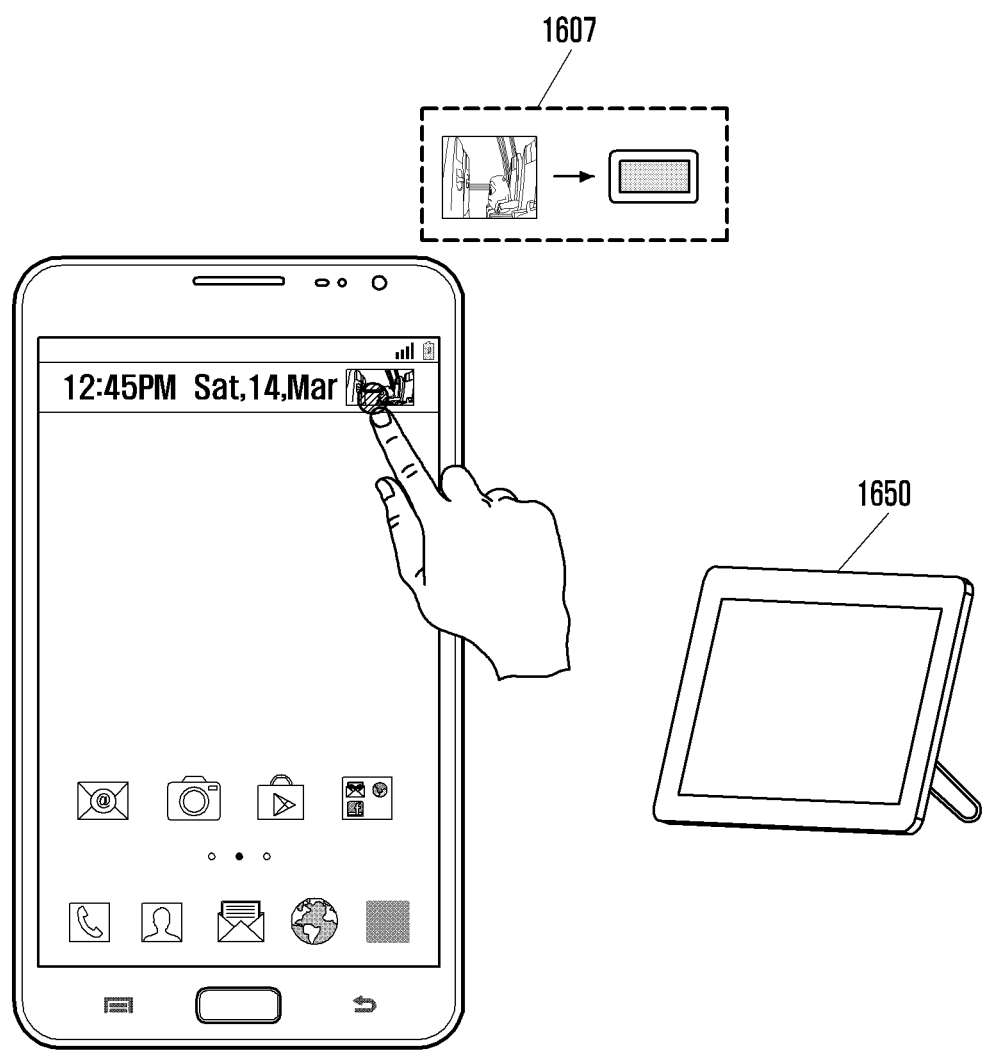
FIG. 16 illustrates a user interface for providing a synchronization function using an App bar according to an embodiment of the present disclosure.

Referring to FIG. 16, when a predetermined user input (for example, a pressure higher than a predetermined value, direction, and tap) is received through a content area displayed in the App bar, the electronic device may stop the content being played in at least one of the electronic device and the synchronized device 1650. Additionally, as illustrated in the enlarged view 1607 the electronic device may change a content image of the App bar to an object including information of synchronizing with the synchronized device 1650 according to the stopping of the content play.

According to an embodiment of the present disclosure, the synchronized device 1650 may include a sub-display of the electronic device.

The electronic device may display a specific object based on user information obtained through a fingerprint sensor according to a security level of the object provided through the App bar. For example, for an object requiring a high security level related to an IM, the electronic device may provide an IM object through a subarea after a user's fingerprint is authenticated.

Figure 17A:
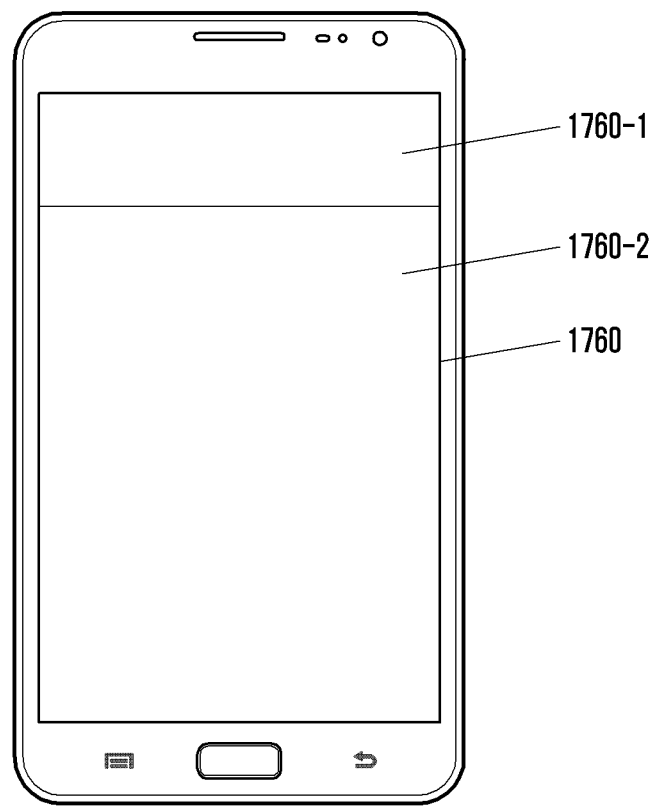
FIG. 17A illustrates a display of an electronic device including a first sub-display module and a second sub-display module according to an embodiment of the present disclosure.

FIG. 17A illustrates a display of an electronic device including a first sub-display module and a second sub-display module according to an embodiment of the present disclosure.

Referring to FIG. 17A, a first area (for example, a subarea) of a display module 1760 is configured with a first sub-display module 1760-1, and a second area (for example, a main area) is configured with a second sub-display module 1760-2. The first sub-display module 1760-1 and the second sub-display module 1760-2 may be independently controlled by a processor.

Alternatively, the display module 1760 may be configured in an integrated form simultaneously including the first area and the second area.

Figure 17B:
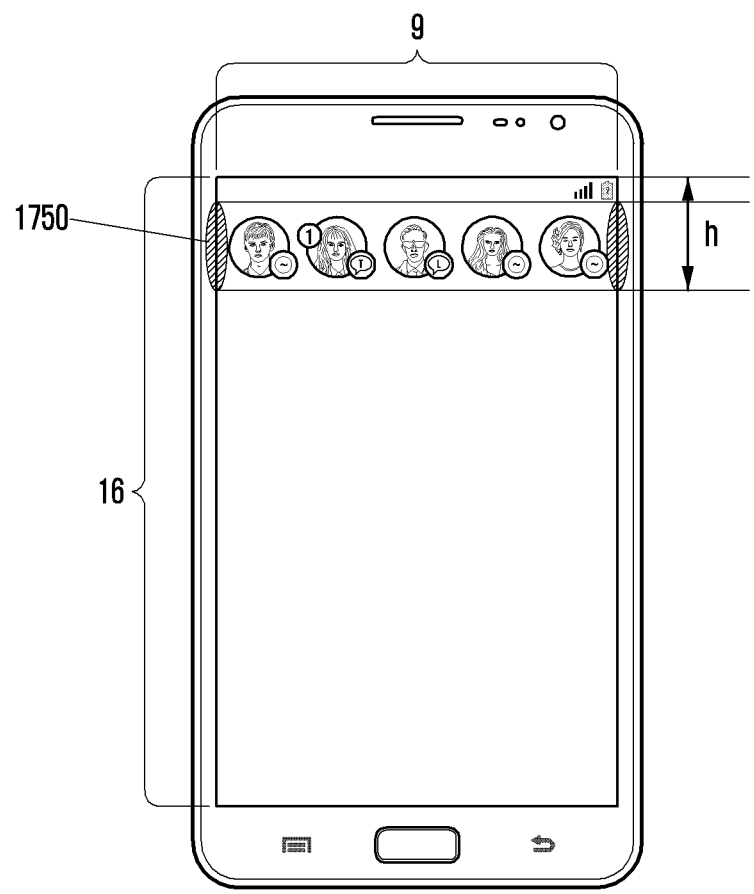
FIG. 17B illustrates a display of an electronic device according to an embodiment of the present disclosure.

FIG. 17B illustrates a display of an electronic device according to an embodiment of the present disclosure.

Referring to FIG. 17B, the electronic device includes a display that provides an App bar function. For example, the display may be formed with a ratio 9:16 in width and height. The electronic device may have a longer display by a predetermined length h in height than a standard display. The predetermined length h may be variously changed.

The electronic device may further include a fingerprint sensor at a predetermined side of the display. For example, the fingerprint sensor may be located at a side 1750 corresponding to a subarea of the display. Accordingly, the electronic device may easily obtain a fingerprint when activating an App bar of the subarea.

Figure 17C:
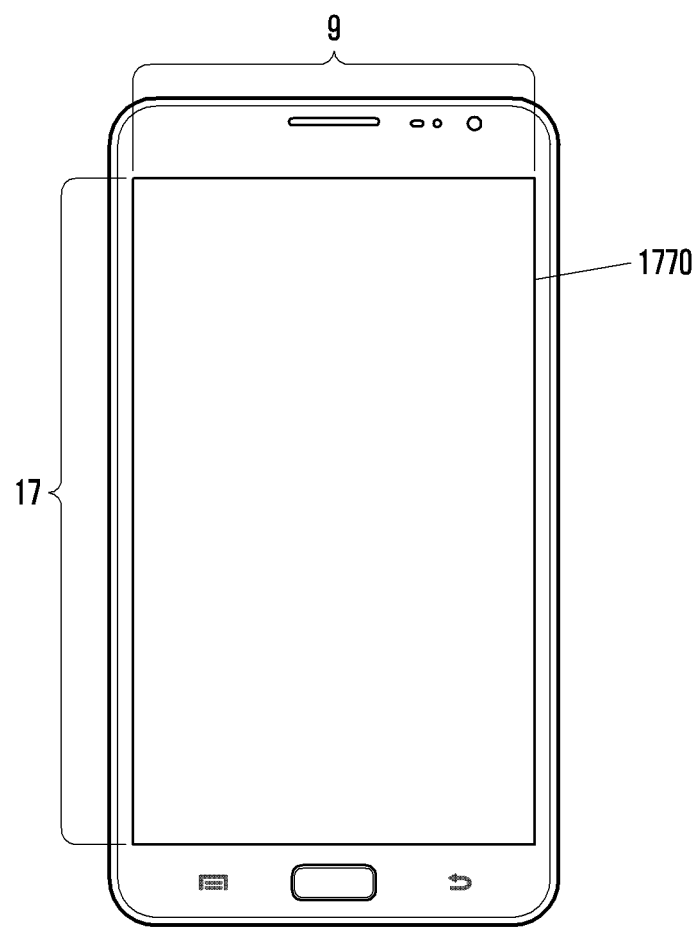
FIG. 17C illustrates a display of an electronic device according to an embodiment of the present disclosure.

FIG. 17C illustrates a display of an electronic device according to an embodiment of the present disclosure.

Referring to FIG. 17C, the electronic device includes a display 1770 having a ratio 9:17 in width and height, where the height of the display 1770 is about 1 cm longer than the height of the display illustrated in FIG. 17B. Further, the display 1770 may also have a ratio of about 9:18 or 9:19, without being limited to the above example.

Figure 18:
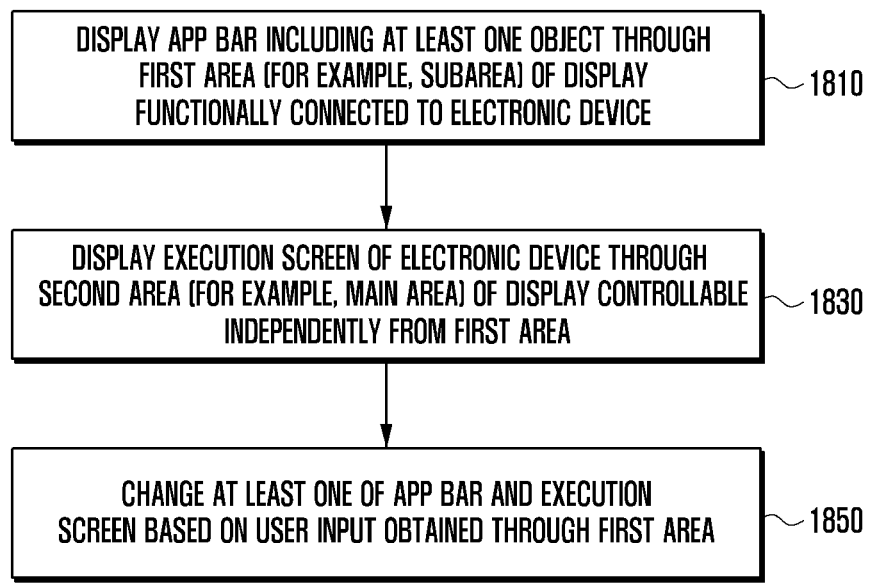
FIG. 18 is a flowchart illustrating a method for controlling an App bar in an electronic device according to an embodiment of the present disclosure.

FIG. 18 is a flowchart illustrating a method for controlling an App bar in an electronic device according to an embodiment of the present disclosure.

Referring to FIG. 18, in step 1810, the electronic device displays an App bar including at least one object through a first area (for example, a subarea) of a display.

In step 1830, the electronic device displays an execution screen of an application being executed in the electronic device through a second area (for example, a main area) of the display, which can be controlled independently.

In step 1850, the electronic device changes at least one of the App bar and the execution screen based on a user input obtained through the first area.

The order of the steps illustrated in FIG. 18 is not fixed and may differ according to various alternatives. Further, additional steps may be included or a specific step may be excluded according to an embodiment.

Figure 19:
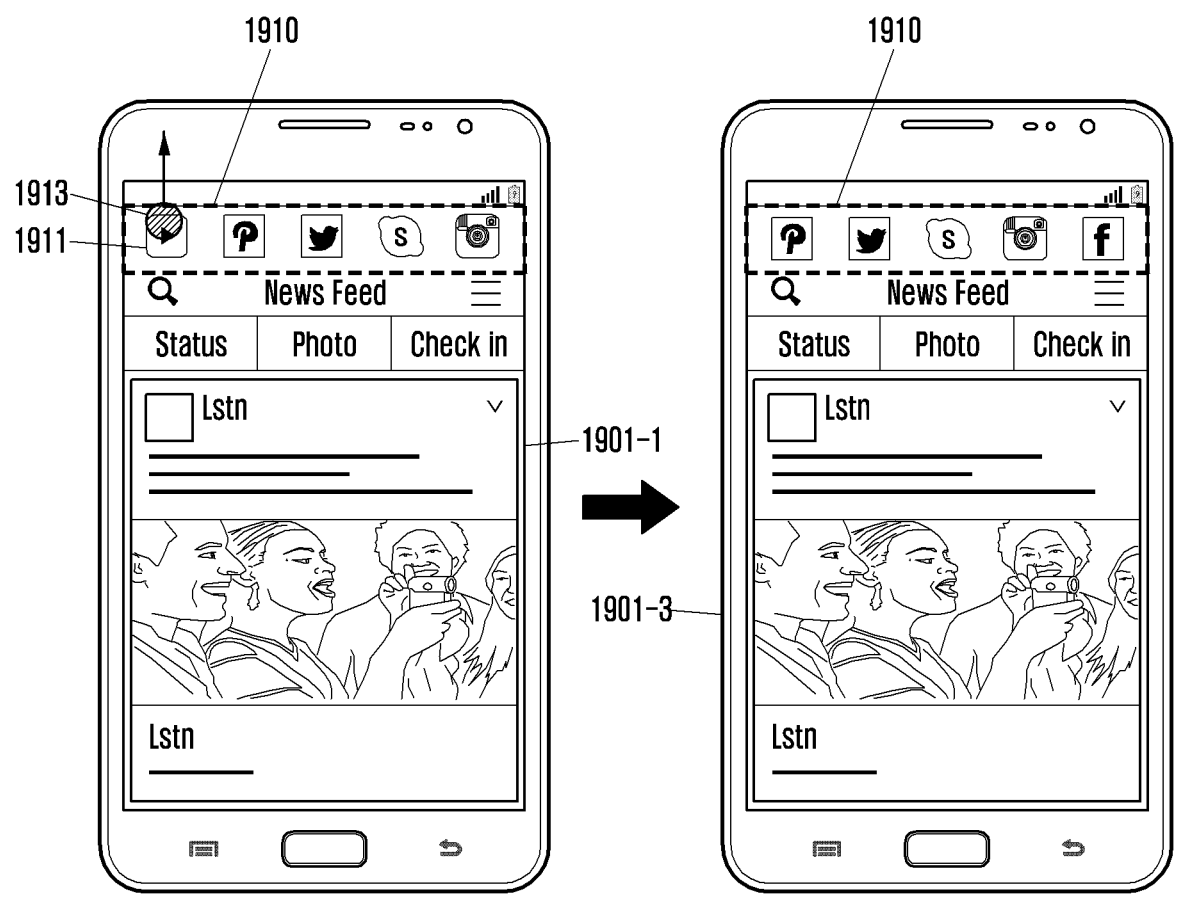
FIG. 19 illustrates a user interface for removing an object from an App bar according to an embodiment of the present disclosure.

FIG. 19 illustrates a user interface for removing an object from an App bar according to an embodiment of the present disclosure.

Referring to FIG. 19, in a first user interface 1901-1, an electronic device displays a plurality of objects (for example, application icons) in an App bar 1910.

When a user input 1913 is received on object 1911 in a first area where the App bar 1910 is displayed, the electronic device removes the object 1911 from the App bar 1910 based on an attribute of the user input. In this case, existing objects can be shifted one by one towards the area from which the object 1913 was removed. For example, the electronic device moves the remaining objects in the App bar 1910 one spot to the left, as illustrated in a second user interface 1901-3.

Figure 20:
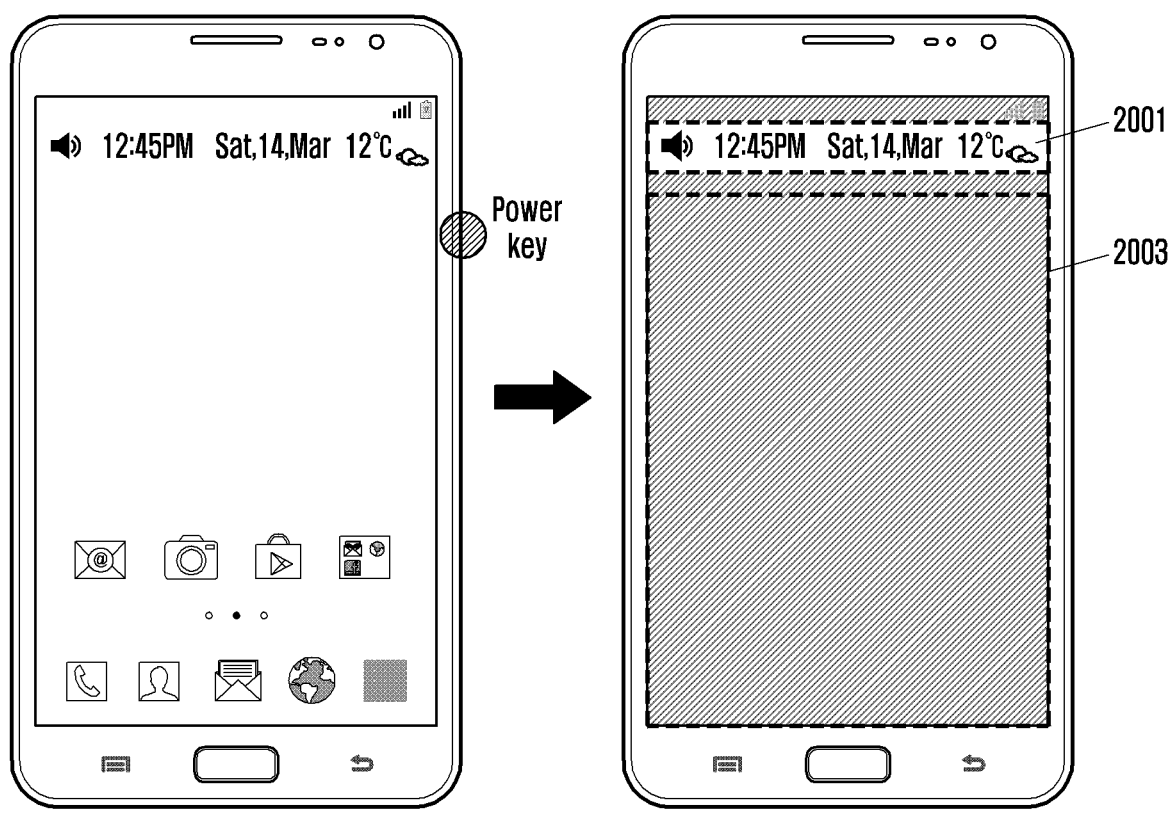
FIG. 20 illustrates displaying a status bar through a first area while a second area of a display is switched off in an electronic device according to an embodiment of the present disclosure.

FIG. 20 illustrates displaying a status bar through a first area while a second area of a display is switched off in an electronic device according to an embodiment of the present disclosure.

Referring to FIG. 20, in response to a user input, e.g., pressing a hold key, lock/unlock key, or power key, or when no input being detected for a predetermined time, the electronic device 201 may set a second area 2003 of a display to a display-off state. While the second area 2003 of the display is in a display-off state, the electronic device controls a status bar to be displayed in a first area 2001 of the display. The status bar may include current state information such as a date, time, and battery remainder.

While displaying an application executed in a second area (e.g., the main area), the electronic device may also display information related to the application through a first area (e.g., the subarea).

Figure 21A:
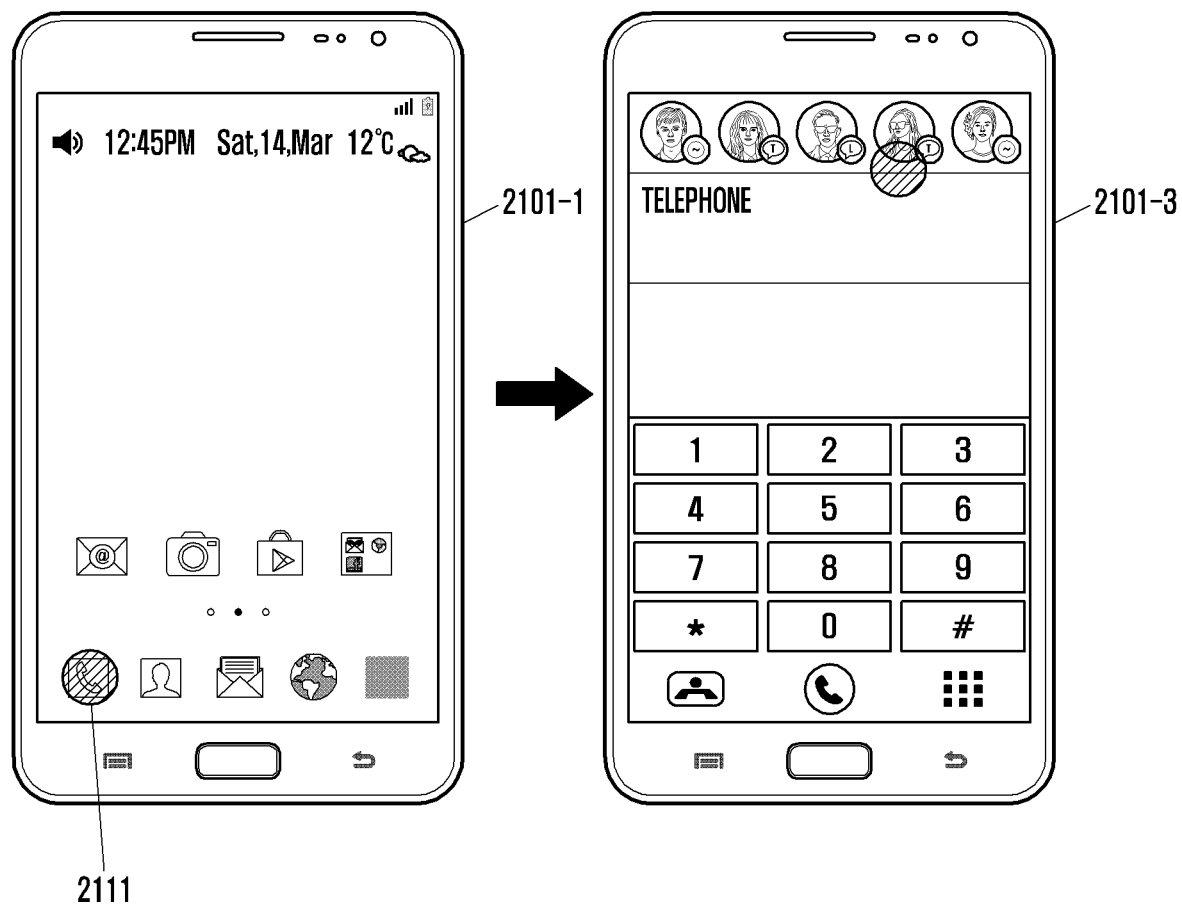
FIG. 21A illustrates a user interface including a first area and a second area of a display of an electronic device according to an embodiment of the present disclosure.

FIG. 21A illustrates a user interface including a first area and a second area of a display of an electronic device according to an embodiment of the present disclosure.

Referring to FIG. 21A, when a user input 2111 for selecting a telephone application is received through a user interface 2101-1, the electronic device displays a virtual keyboard in the second area, and simultaneously displays user representations in the first area. The user representations may be displayed using various methods, such as displaying in an order of a recent telephone activity, using a favorites list, or based on frequency of telephone conversations.

Figure 21B:
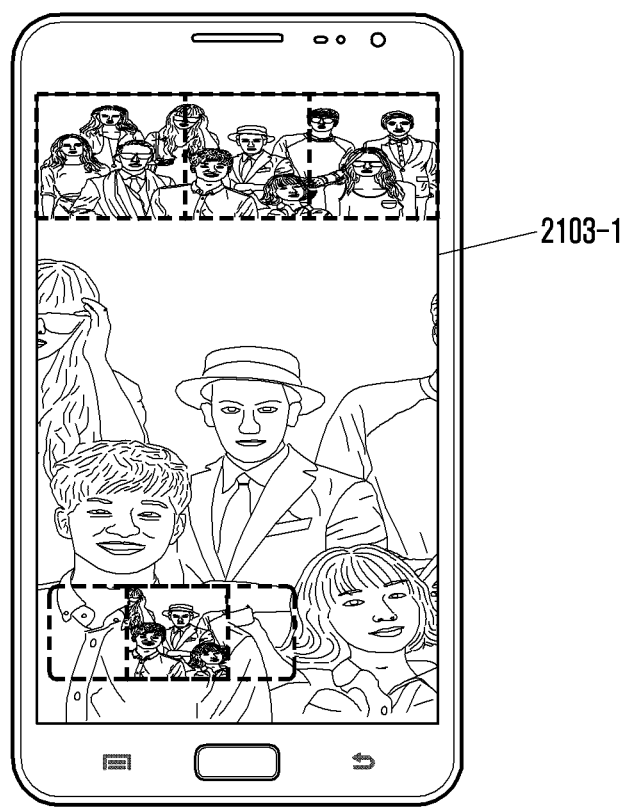
FIG. 21B illustrates a user interface including a first area and a second area of a display of an electronic device according to an embodiment of the present disclosure.

FIG. 21B illustrates a user interface including a first area and a second area of a display of an electronic device according to an embodiment of the present disclosure.

Referring to FIG. 21B, when a user selects a panorama image by executing a gallery application in a user interface 2103-1, the electronic device displays a portion of the panorama image selected by the user in the second area and the complete panorama image in the first area.

Figure 21C:
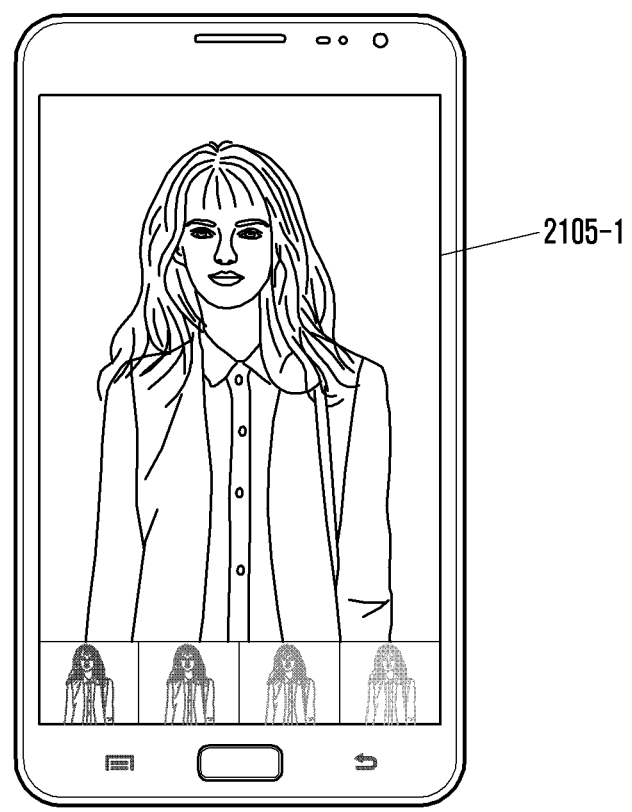
FIG. 21C illustrates a user interface including a first area and a second area of a display of an electronic device according to an embodiment of the present disclosure.

FIG. 21C illustrates a user interface including a first area and a second area of a display of an electronic device according to an embodiment of the present disclosure.

Referring to FIG. 21C, when a user enters an image editing mode, e.g., by executing the gallery application, in a user interface 2105-1, the electronic device displays a selected image in the second area, and a plurality of copies of the selected image with different brightness effects in the first area. Although the first area (for example, a subarea) is located under the second area (for example, a main area) in FIG. 21C, the present disclosure is not limited thereto.

Figure 21D:
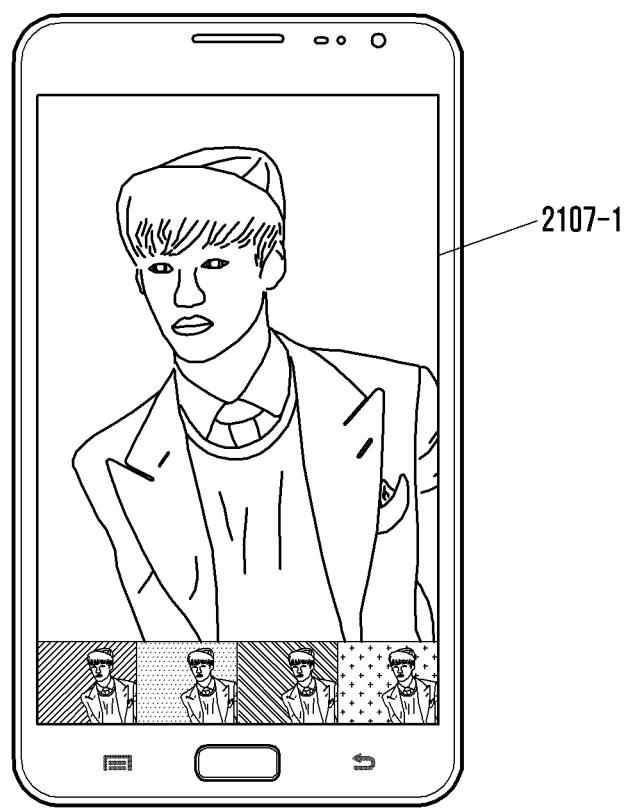
FIG. 21D illustrates a user interface including a first area and a second area of a display of an electronic device according to an embodiment of the present disclosure.

FIG. 21D illustrates a user interface including a first area and a second area of a display of an electronic device according to an embodiment of the present disclosure.

Referring to FIG. 21D, when a user enters an image editing mode, e.g., by executing a gallery application, in a user interface 2107-1, the electronic device displays a selected image in the second area and a plurality of copies of the selected image with different background effects in the first area.

Figure 22:
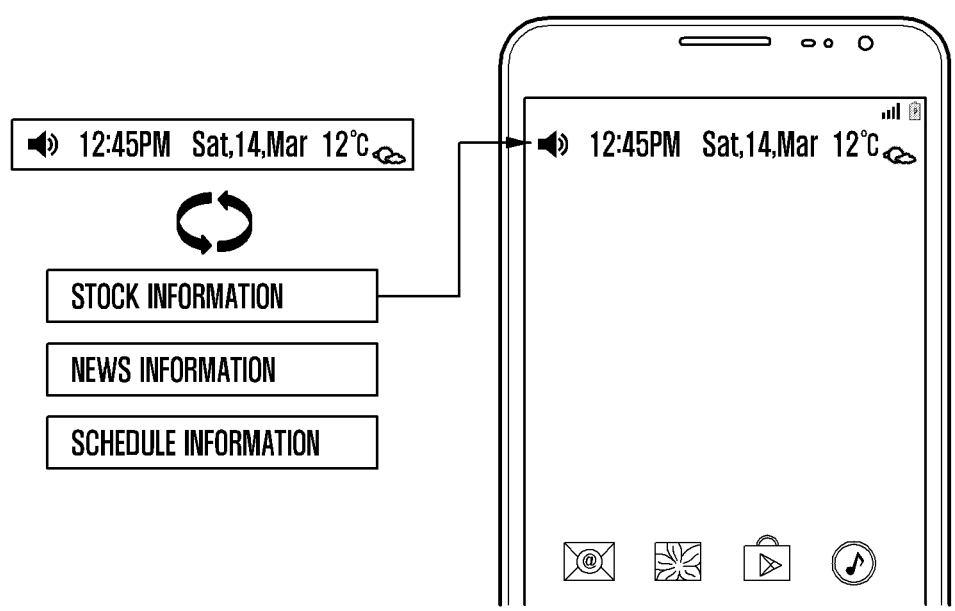
FIG. 22 illustrates changing a status bar displayed in a first area of a display in an electronic device according to an embodiment of the present disclosure.

FIG. 22 illustrates changing a status bar displayed in a first area of a display according to an embodiment of the present disclosure.

Referring to FIG. 22, the electronic device displays the status bar through the first area (for example, a subarea) of the display. The electronic device may change information displayed in the status bar based on a user setting. For example, the electronic device may display a status bar including stock information, news information, or schedule information in the first area based on the user setting. For example, the user setting may also control the electronic device to automatically scroll through the different types of information in the status bar.

Further, the electronic device is not limited to the above-described examples of information, and can display a status bar including diversified information in the first area.

FIG. 23 illustrates user inputs and corresponding functions in an electronic device according to an embodiment of the present disclosure.

Referring to FIG. 23, a tap input 2301 may be input for executing a specific application or selecting a specific object, a tap & hold input 2303 may be input for editing a specific object, a right/left swipe input 2305 may be input for returning from a specific page to a previous page or passing to a next page, a vertical swipe down input 2307 may be input for scrolling down or executing an application, a vertical swipe up input 2309 may be input for scrolling up or terminating an execution of an application, and a tap & drag input 2311 may be input for moving an object or adjusting an attribute value.

The electronic device is not limited to the example inputs and functions described above and can detect various other user inputs. Further, different inputs and/or corresponding functions may be automatically or manually adjusted according to user settings, electronic device manufacturer settings, or other information.

Figure 24:
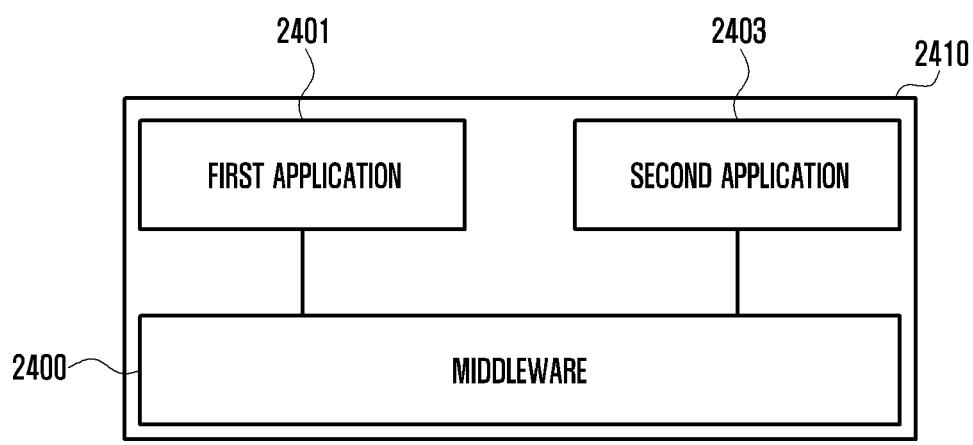
FIG. 24 illustrates a processor according to an embodiment of the present disclosure.

FIG. 24 illustrates a processor according to an embodiment of the present disclosure.

Referring to FIG. 24, the processor 2410 includes a first application 2401, a second application 2403, and middleware 2400.

For example, an electronic device including the processor 2410 can provide a semi-transparent chatting window, e.g., as illustrated in FIG. 6A, for a user through the first application 2401 or the second application 2403.

The first application 2401 may be a messenger application for providing a message service, which was downloaded by the user from an application store, and the second application 2403 may be a separate messaging application installed by a manufacturer. For example, if a user receives or transmits a message through the messenger application of the first application 2401, the electronic device may provide a semi-transparent chatting window, e.g., as illustrated in FIG. 6A. In this case, the first application 2401 can use middleware 2400 configured to transmit or receive a message through the first application 2401.

As another example, if the user receives or transmits a message through the first application 2401, the electronic device may provide a semi-transparent chatting window in the second application 2403 (other than the first application 2401). In this case, a second application 2403 may display a message by receiving data from the first application 2401 or use the middleware 2400 configured to transmit a prepared message to the first application 2401.

Figure 25:
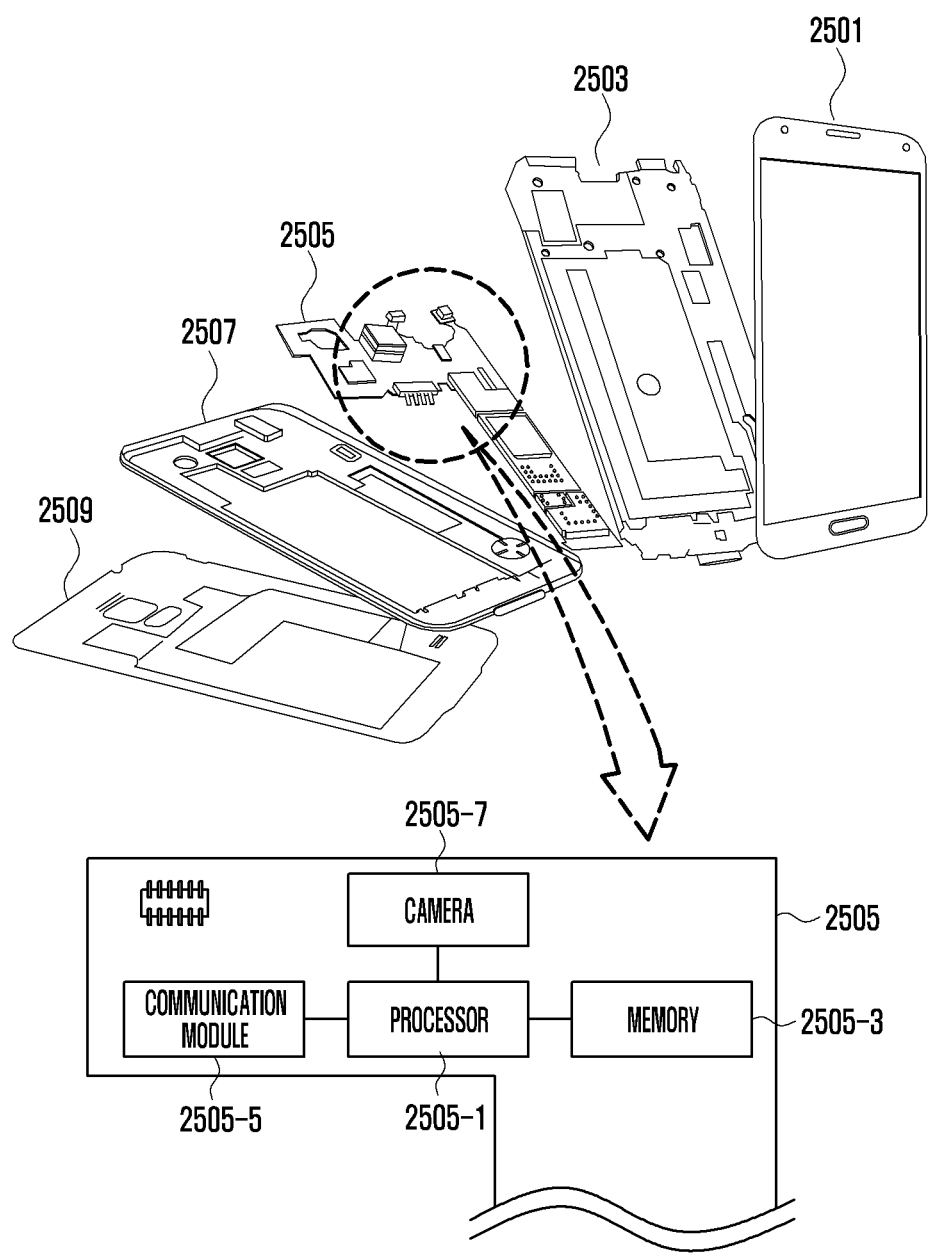
FIG. 25 illustrates a layer structure of an electronic device according to an embodiment of the present disclosure.

FIG. 25 illustrates a layer structure of an electronic device according to an embodiment of the present disclosure.

Referring to FIG. 25, the electronic device includes a display module 2501, a bracket 2503, a mainboard 2505, a mainboard container 2507, and a rear cover 2509.

For example, the display module 2501 may have the same or similar functionality as the display module 260 illustrated in FIG. 2.

The bracket 2503 supports the display module 2501 in order to fix the display module 2501.

The mainboard 2505 includes a processor 2505-1, a memory 2505-3, a communication module 2505-5, and a camera module 2505-7. For example, the memory 2505-3, the processor 2505-1, the communication module 2505-5, and the camera module 2505-7 may have the same or similar functionality as the memory 230, the processor 210, the communication module 220, and the camera module 291, respectively, as illustrated in FIG. 2.

Although not illustrated in FIG. 25, the mainboard 2505 may also various modules illustrated in FIG. 2.

While executing an application, the memory 2503-3 stores instructions for the processor 2505-1 to display an App bar including at least one object through a first area of the display module 2501, display an execution screen for an application being executed in the electronic device through a second area of the display module 2501, and change at least one of the displayed App bar or the displayed execution screen based on a first user input obtained through the first area.

While executing an application, if the processor 2505-1 generates an event for an object included in the App bar, the memory 2503-3 stores instructions to display information related to the event adjacent to the object.

While executing an application, the memory 2503-3 stores instructions for the processor 2505-1 to identify an attribute of the first user input and display the App bar based on the attribute of the first user input.

While executing an application, the memory 2503-3 stores instructions to maintain the execution screen of the second area while the processor 2505-1 detects the first user input through the first area.

While executing an application, the memory 2503-3 stores instructions for the processor 2505-1 to display another object related to the object in at least one area of the execution screen displayed in the second area in response to the first user input for selecting an object of the App bar displayed in the first area.

While executing an application, the memory 2503-3 stores instructions for the processor 2505-1 to change the App bar to a status bar responding to the first user input.

While executing an application, the memory 2503-3 stores instructions for the processor 2505-1 to change the status bar displayed in the first area to another status bar according to a user setting.

While executing an application, the memory 2503-3 stores instructions for the processor 2505-1 to share a specific object with a target object in response to a second user input for moving the specific object of at least one object displayed in the second area to the target object displayed in the first area.

While executing an application, the memory 2503-3 stores instructions for the processor 2505-1 to set the second area of the display to a display-off state in response to a user input, and control the display to maintain a status bar through the first area of the display while the second area of the display is a the display-off state.

The mainboard container 2507 fixes the mainboard 2505.

The rear cover 2509 fixes a battery of the electronic device by combining with the mainboard container 2507.

As described above, an electronic device according to an embodiment of the present disclosure allows a user to quickly and efficiently identify information by providing diversified information through a subarea which is controlled independently from a main area of a display.

Each of the aforementioned elements of the electronic device may consist of one or more components, and names thereof may vary depending on a type of the electronic device. The electronic device may include at least one of the aforementioned elements. Some of the elements may be omitted, or additional other elements may be further included. In addition, some of the elements of the electronic device may be combined and constructed as one entity, so as to equally perform functions of corresponding elements before combination.

At least some parts of the electronic device (e.g., modules or functions thereof) or method (e.g., operations) may be implemented with an instruction stored in a non-transitory computer-readable storage media for example. The instruction may be executed by a processor (e.g., processor 2505-1), to perform a function corresponding to the instruction.

Examples of non-transitory computer-readable media include magnetic media, such as hard disks, floppy disks, and magnetic tape; optical media such as Compact Disc Read Only Memory (CD-ROM) disks and a DVD; magneto-optical media, such as floptical disks; and hardware devices that are configured to store and perform program instructions (e.g., programming modules), such as a ROM, a RAM, a flash memory, etc.

Examples of program instructions include machine code instructions generated using assembly languages, such as by a compiler, and code instructions created using a high-level programming language executable in computers using an interpreter, etc.

The hardware devices described above may be configured to act as one or more software modules in order to perform the operations and methods described above, or vice versa.

Modules or programming modules according to an embodiment of the present disclosure may include one or more components, remove part of the components described above, or include new components. The operations performed by modules, programming modules, or the other components, according to the present invention, may be executed in serial, parallel, repetitive or heuristic fashion. Part of the operations can be executed in any order, skipped, or executed with additional operations.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. An electronic device comprising:
a display; and
a processor configured to:
display an application (App) bar including a plurality of user representations through a first area of the display;
display an execution screen of a first application through a second area of the display in response to a first input of selecting an icon corresponding to the first application displayed in the second area;
receive a second user input of dragging a first object included in the execution screen of the first application to a target user representation displayed in the first area, the target user representation being one of the plurality of user representations; and
in response to the second user input:
execute a second application corresponding to the target user representation in a background state, the background state being a state in which the execution screen of the first application is displayed through the second area of the display and an execution screen of the second application is not displayed through the second area of the display, and
transmit data associated with the first object to a device corresponding to the target user representation using the second application executed in the background state.

2. The electronic device of claim 1, wherein the processor is further configured to identify an event related to one of the plurality of user representations included in the App bar and display information related to the event adjacent to the one of the plurality of user representations in the App bar.

3. The electronic device of claim 1, wherein the processor is further configured to identify an attribute of the first user input and to modify the App bar based on the attribute of the first user input.

4. The electronic device of claim 1, wherein the processor is further configured to maintain the displayed execution screen of the second area while detecting the first user input through the first area.

5. The electronic device of claim 1, wherein the first user input selects one of the plurality of user representations included the App bar displayed in the first area, and
wherein the processor is further configured to display an object related to the one of the plurality of user representations in the execution screen displayed in the second area, in response to the first user input for selecting the one of the plurality of user representations from the App bar.

6. The electronic device of claim 1, wherein the processor is further configured to change the App bar to a status bar in response to the first user input.

7. The electronic device of claim 6, wherein the processor is further configured to switch off the second area of the display, and to control the display to maintain the display of the status bar through the first area of the display, while the second area of the display is switched off.

8. The electronic device of claim 6, wherein the processor is further configured to change the status bar displayed through the first area to another status bar according to a user setting.

9. The electronic device of claim 1, wherein the first area is configured with a first sub-display module and the second area is configured with a second sub-display module, and
wherein the first sub-display module and the second sub-display module are independently controlled by the processor.

10. A method for operating an electronic device including a display, the method comprising:
displaying an application (App) bar including a plurality of user representations through a first area of the display, wherein each of the plurality of user representations indicates one or more applications used by a respective user;
displaying an execution screen of a first application through a second area of the display in response to a first input of selecting an icon corresponding to the first application displayed in the second area;
receiving a second user input of dragging a first object included in the execution screen of the first application to a target user representation displayed in the first area, the target user representation being one of the plurality of user representations; and
in response to the second user input:
executing a second application corresponding to the target user representation in a background state, the background state being a state in which the execution screen of the first application is displayed through the second area of the display and an execution screen of the second application is not displayed through the second area of the display, and
transmitting data associated with the first object to a device corresponding to the target user representation using the second application executed in the background state.

11. The method of claim 10, further comprising identifying an event related to one of the plurality of user representations included in the App bar,
wherein displaying the App bar comprises displaying information related to the event adjacent to the one of the plurality of user representations.

12. The method of claim 10, wherein changing the displayed App bar comprises:
identifying an attribute of the first user input; and
changing the App bar based on the identified attribute of the first user input.

13. The method of claim 10, further comprising maintaining the displayed execution screen of the second area, while detecting the first user input through the first area.

14. The method of claim 10, further comprising identifying the first user input as selecting one of the plurality of user representations from the App bar displayed in the first area, wherein changing the displayed execution screen comprises displaying an object related to the one of the plurality of user representations in the displayed execution screen, in response to the first user input.

15. The method of claim 10, wherein changing the displayed App bar comprises changing the App bar to a status bar.

16. The method of claim 15, further comprising:
switching off the second area of the display; and
maintaining displaying the status bar through the first area of the display, while the second area of the display is switched off.

17. The method of claim 15, further comprising changing the status bar displayed through the first area to another status bar according to a user setting.

18. A non-transitory computer-readable storage media for storing instructions, which when executed by a processor included in an electronic device, control the processor to:

display an application (App) bar including a plurality of user representations through a first area of a display, wherein each of the plurality of user representations indicates one or more applications used by a respective user;

display an execution screen of a first application through a second area of the display in response to a first input of selecting an icon corresponding to the first application displayed in the second area;

receive a second user input of dragging a first object included in the execution screen of the first application to a target user representation displayed in the first area, the target user representation being one of the plurality of user representations; and in response to the second user input:
execute a second application corresponding to the target user representation in a background state, the background state being a state in which the execution screen of the first application is displayed through the second area of the display and an execution screen of the second application is not displayed through the second area of the display, and transmit data associated with the first object to a device corresponding to the target user representation using the second application executed in the background state.

* * * * *